United States Patent
Kowaka

(10) Patent No.: US 10,645,250 B2
(45) Date of Patent: May 5, 2020

(54) IMAGE FORMING SYSTEM, ORIGINAL DOCUMENT ARRANGEMENT SETTING METHOD AND NON TRANSITORY RECORDING MEDIUM THAT RECORDS AN ORIGINAL DOCUMENT ARRANGEMENT SETTING PROGRAM

(71) Applicant: KYOCERA Document Solutions Inc., Osaka (JP)

(72) Inventor: Makoto Kowaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 258 days.

(21) Appl. No.: 15/832,228

(22) Filed: Dec. 5, 2017

(65) Prior Publication Data
US 2018/0160005 A1    Jun. 7, 2018

(30) Foreign Application Priority Data
Dec. 6, 2016    (JP) .................................. 2016-236794

(51) Int. Cl.
*H04N 1/19* (2006.01)
*G06T 7/13* (2017.01)
*G06K 9/32* (2006.01)

(52) U.S. Cl.
CPC ............. *H04N 1/19* (2013.01); *G06K 9/3208* (2013.01); *G06T 7/13* (2017.01)

(58) Field of Classification Search
None
See application file for complete search history.

(56) References Cited

U.S. PATENT DOCUMENTS

| 6,314,213 B1* | 11/2001 | Miyahara | G06K 9/3208 |
| | | | 358/1.11 |
| 2005/0185216 A1* | 8/2005 | Mitsuhashi | H04N 1/00496 |
| | | | 358/1.15 |
| 2014/0118764 A1* | 5/2014 | Maghakian | B41J 3/44 |
| | | | 358/1.13 |

FOREIGN PATENT DOCUMENTS

JP    2005-244497 A    9/2005

\* cited by examiner

*Primary Examiner* — Jiangeng Sun
(74) *Attorney, Agent, or Firm* — Stein IP, LLC

(57) ABSTRACT

A relative position identification portion is included that identifies a relative position of a personal digital assistant with respect to an image forming apparatus. The relative position identification portion acquires the relative position of the image forming apparatus and the personal digital assistant, displays, on the display portion of the personal digital assistant, an image that shows the position and the direction of the image forming apparatus seen from a user who carries the personal digital assistant and an image of the position and the direction of an original document which is arranged in the reading portion of the image forming apparatus and which is seen from the user and thereafter transmits, to the image forming apparatus, setting information based on an input operation of the operator.

7 Claims, 14 Drawing Sheets

IMAGE FORMING SYSTEM, ORIGINAL DOCUMENT ARRANGEMENT SETTING METHOD AND NON TRANSITORY RECORDING MEDIUM THAT RECORDS AN ORIGINAL DOCUMENT ARRANGEMENT SETTING PROGRAM

INCORPORATION BY REFERENCE

This application is based upon and claims the benefit of priority from the corresponding Japanese Patent Application No. 2016-236794 filed on Dec. 6, 2016, the entire contents of which are incorporated herein by reference.

BACKGROUND

The present disclosure relates to an image forming system including an image forming apparatus which forms an image on a sheet, an original document arrangement setting method of performing an original document arrangement setting on the image forming apparatus and non transitory recording medium that records an original document arrangement setting program.

A multifunctional peripheral is known into which the functions of a printer, a copying machine, a scanner, a facsimile machine, e-mail and the like are integrated. For example, there is a conventional multifunctional peripheral in which communication is performed with a memory card possessed by a user so as to identify the user, and in which thus the angle of the operation panel of the multifunctional peripheral is automatically adjusted so as to be an appropriate angle for the user.

In a conventional multifunctional peripheral, it is assumed that the user stands in front of the operation panel in the multifunctional peripheral so as to operate the operation panel, and when the user is present in an place other than the front surface of the multifunctional peripheral, the operation panel does not have an appropriate angle for the user, with the result that the operability may be unsatisfactory. In a case where an original document is read in a copying machine or a facsimile machine, though it is necessary to read the original document, when the user is not present in front of the front surface, the original document is easily placed in a wrong position and in a wrong direction, with the result that it is likely that the reading is not accurately performed or that the user is confused.

SUMMARY

An image forming system according to the present disclosure includes an image forming apparatus that includes a reading portion which reads an image of an original document set on an original document stage and a personal digital assistant that includes a display portion which can display information. In at least one of the image forming apparatus and the personal digital assistant, a relative position identification portion is included that identifies the relative position of the personal digital assistant with respect to the image forming apparatus. The personal digital assistant displays, on the display portion, an image that shows the position and the direction of the original document stage and an image that shows the arrangement position and the direction of the original document on the original document stage from the personal digital assistant whose relative position is identified. The personal digital assistant receives an input operation of a user on the personal digital assistant and transmits, to the image forming apparatus, information for setting the position and the direction in which the original document is set on the original document stage.

Further features and advantages of the present disclosure will become more apparent from the description of embodiments given below.

DETAILED DESCRIPTION

An image forming system according to the present embodiment will be described below with reference to drawings. Individual elements such as configurations and arrangements described in the present embodiment do not limit the scope of the disclosure and are simply examples for the description.

First Embodiment (Image Forming System Sys)

Figure 1:
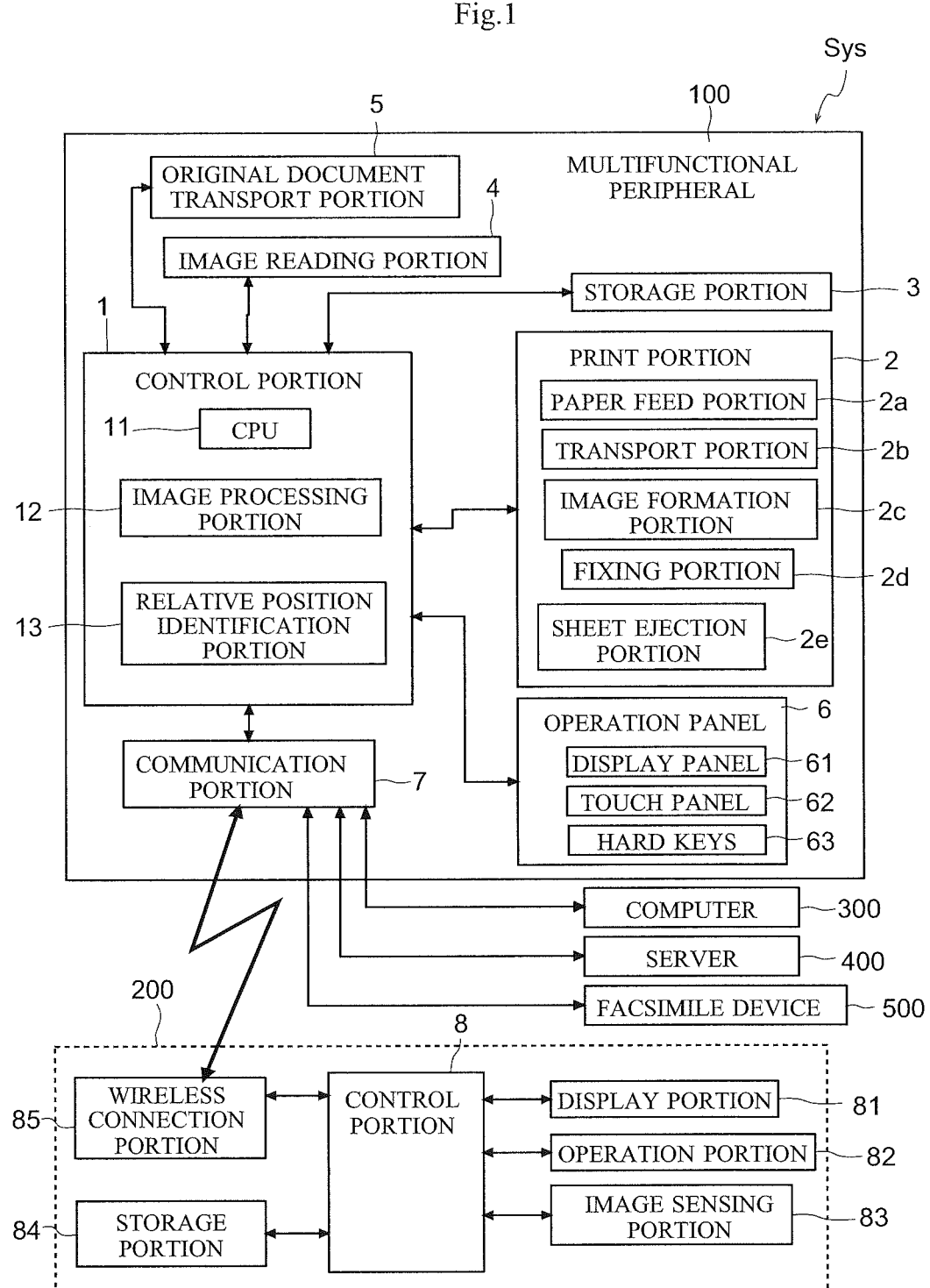
FIG. 1 is a functional block diagram showing a main configuration of an image forming system which includes a multifunctional peripheral and a personal digital assistant according to the present disclosure.
Figure 2:
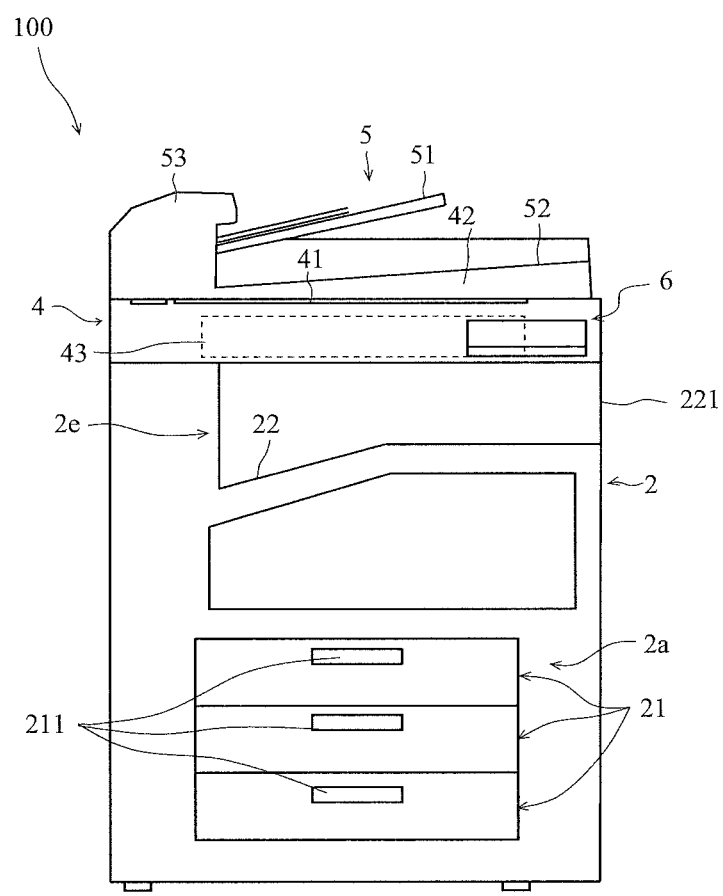
FIG. 2 is a diagram showing a schematic configuration of an example of the multifunctional peripheral included in the image forming system of FIG. 1.

FIG. 1 is a functional block diagram showing a main configuration of an image forming system which includes a multifunctional peripheral and a personal digital assistant according to the present disclosure. FIG. 2 is a diagram showing a schematic configuration of an example of the multifunctional peripheral included in the image forming system of FIG. 1. As shown in FIG. 1, the image forming system Sys includes the multifunctional peripheral 100 and the personal digital assistant 200 which is wirelessly connected to the multifunctional peripheral 100.

The multifunctional peripheral 100 is, for example, a multifunctional peripheral which has a plurality of functions such as a copying function, a printer function, a scanner function and a facsimile function. However, there is no limitation to this configuration, and an image forming apparatus which has at least a scanner function (original document reading function) can be widely adopted.

The personal digital assistant 200 is, for example, a information terminal, such as a smartphone or a tablet PC, which includes a touch operation portion which serves both as a display portion 81 and an operation portion 82 and an image sensing portion 83. The personal digital assistant 200 is not limited to this configuration, and a personal digital assistant which includes a display portion and an image sensing portion can be widely adopted.

(Multifunctional Peripheral 100)

As shown in FIG. 1, in the multifunctional peripheral 100, a control portion 1 (main control substrate), a print portion 2 and a storage portion 3 are included. The multifunctional peripheral 100 includes an image reading portion 4, an original document transport portion 5 and an operation panel 6. As shown in FIG. 2, in the multifunctional peripheral 100, the image reading portion 4 is arranged above the print portion 2, and the original document transport portion 5 is arranged above the image reading portion 4.

The control portion 1 performs the overall control of the multifunctional peripheral 100. The control portion 1 includes a CPU 11. In the multifunctional peripheral 100, the storage portion 3 is also included which includes a nonvolatile memory such as a ROM, an HDD or a flash ROM and a volatile memory such as a RAM. The storage portion 3 stores programs and data on the control. The control portion 1 utilizes the programs and the data in the storage portion 3 so as to control the individual portions. The control portion 1 controls scanning, printing, transmission and the storage of image data which are performed for jobs such as copying and transmission.

(Control Portion 1)

In the control portion 1, an image processing portion 12 is included which performs image processing based on image data output from the image reading portion 4, image data transmitted through a communication portion 7 from a computer 300, a server 400, a facsimile device 500 and the like, furthermore, image data obtained by the image sensing of the image sensing portion 83 in the personal digital assistant 200 and the like. The image processing portion 12 reads the details of an image included in the image data. For example, when the image data is photograph data, the image processing portion 12 can distinguish the shapes, the colors and the like of objects included in the image which is shot.

The control portion 1 also includes a relative position identification portion 13 that identifies the relative position of the personal digital assistant 200 (in other words, a user) with respect to the multifunctional peripheral 100 based on the details of the image which is sensed in the image sensing portion 83 of the personal digital assistant 200 and which is then processed in the image processing portion 12. The operations of the image processing portion 12 and the relative position identification portion 13 will be described later.

(Operation Panel 6)

The operation panel 6 includes a display panel 61, a touch panel 62 and hard keys 63. The touch panel 62 is used for detecting the touch position of the user. The control portion 1 recognizes, based on the output of the touch panel 62, one of operation images such as keys and buttons displayed on the display panel 61 which is operated. The hard keys 63 include a start key for providing an instruction to start the performance of a job and a numeric keypad for inputting numbers. The control portion 1 displays, on the display panel 61, the state of the operation panel 6, various types of messages and a setting screen. The operation panel 6 receives setting operations on the touch panel 62 and the hard keys 63 for the jobs such as the scanning and the copying.

(Print Portion 2)

The print portion 2 includes a paper feed portion 2a, a transport portion 2b, an image formation portion 2c, a fixing portion 2d and a sheet ejection portion 2e. The paper feed portion 2a supplies a sheet. The transport portion 2b transports the sheet and ejects the printed sheet to the outside of the print portion 2. The image formation portion 2c forms a toner image based on the image data, and transfers the toner image to the transported sheet. The fixing portion 2d fixes the transferred toner image to the sheet. The control portion 1 controls the operation of the print portion 2.

As shown in FIG. 2, the paper feed portion 2a includes a plurality of paper feed cassettes 21. In the paper feed cassettes 21, sheets are stored. The sheets stored in the individual paper feed cassettes 21 differ from each other in at least one of the size and the direction thereof. The control portion 1 selects, based on an instruction from the user, the size, the direction and the like of the sheet which are appropriate. Then, the control portion 1 selects the paper feed cassette 21 in which the appropriate sheet is stored. Then, the paper feed portion 2a feeds out, according to an instruction from the control portion 1, the sheet from the selected paper feed cassette 21. As shown in FIG. 2, the paper feed cassettes 21 can be pulled out forward (in FIG. 2, toward the front of the plane of the figure) from the side of the multifunctional peripheral 100, and grip portions 211 are exposed to the front surface.

As shown in FIG. 2, an ejection tray 22 is arranged in a gap provided between the print portion 2 and the original document transport portion 5, and the sheet to which the image is fixed in the fixing portion 2d is ejected by the sheet ejection portion 2e to the ejection tray 22. The ejection tray 22 has an opening 221 in the right side of the multifunctional peripheral 100.

(Image Reading Portion 4)

The image reading portion 4 reads, based on the control of the control portion 1, the image of the original document fitted to the upper surface of the housing of the image reading portion 4 so as to generate the image data. As shown in FIG. 2, the image reading portion 4 includes contact glass 41 (original document stage) on which the original document is placed. The image reading portion 4 further includes: an original document holding cover 42 which holds the original document placed on the contact glass 41 and which is freely opened and closed; and a reading mechanism 43 which reads the images of the original document placed on the contact glass 41 and the original document transported to the contact glass 41.

(Original Document Transport Portion 5)

The original document transport portion 5 transports, based on the control of the control portion 1, the original document to the contact glass 41 of the image reading portion 4. The original document transport portion 5 includes an original document placement stage 51 on which the original document is placed, an original document ejection portion 52 to which the original document whose image has been read is ejected and an original document transport mechanism 53 (see FIG. 2). The original document transport mechanism 53 includes a paper feed roller, a transport roller and the like which are not illustrated. The original document transport mechanism 53 feeds out the original documents placed on the original document placement stage 51 one by one by the drive of the paper feed roller and the transport roller, and transports it to the contact glass 41. The original document transported to the contact glass 41 is read by the reading mechanism 43, and is thereafter ejected to the original document ejection portion 52.

The original document transport portion 5 further includes a hinge (unillustrated) on the back side of the plane of FIG. 2. The original document transport portion 5 is turned about the hinge such that the front thereof is moved close to or away from the contact glass 41. The front side of the original document transport portion 5 is moved upward so as to open the upper surface of the contact glass 41, and thus the user can place the original document on the upper surface of the contact glass 41. In a state where the original document is placed on the upper surface of the contact glass 41, the front of the original document transport portion 5 is moved close to the contact glass 41. In this way, the original document can be pressed to the contact glass 41, and thus the image reading portion 4 can accurately read the original document.

In the multifunctional peripheral 100, the original document transported by the original document transport portion 5 or the original document placed on the contact glass 41 is optically read by the image reading portion 4, and thus the image data is generated. The image data generated by the image reading portion 4 is stored in the internal storage portion 3 or a computer which is connected through a network or the like.

(Communication Portion 7)

The multifunctional peripheral 100 includes the communication portion 7. The communication portion 7 has a configuration capable of performing wireless communication, and is connected to the personal digital assistant 200 through a wireless line. The communication portion 7 is connected to the computer 300 such as a PC, the server 400, the facsimile device 500 and the like such that the communication portion 7 can communicate with them through a wired and/or wireless network, a public line and the like. When the computer 300, the server 400 and the facsimile device 500 are wirelessly connected to the communication portion 7, these devices and the personal digital assistant 200 may be connected on the same wireless network. Only the personal digital assistant 200 may be connected to the communication portion 7 through a wireless communication line whose protocol is different from the other devices.

(Personal Digital Assistant 200)

As shown in FIG. 1, the personal digital assistant 200 includes a control portion 8, the display portion 81, the operation portion 82, the image sensing portion 83, a storage portion 84 and a wireless connection portion 85. The control portion 8 performs the overall control of the personal digital assistant 200. The control portion 8 includes a CPU. In the personal digital assistant 200, the storage portion 84 is also included which includes a nonvolatile memory such as a ROM, an HDD or a flash ROM and a volatile memory such as a RAM. The storage portion 84 stores programs and data on the control. The control portion 8 utilizes the programs and the data in the storage portion 84 so as to control the individual portions.

The display portion 81 displays the state of the personal digital assistant 200, various types of information stored in the storage portion 84, the image data obtained by the image sensing of the image sensing portion 83 and the like. Although here, as the display portion 81, a display portion using a liquid crystal panel can be illustrated, there is no limitation to such a configuration. As the operation portion 82, a touch input device can be mentioned in which keys and buttons displayed on the display portion 81 are touched such that the operations are recognized. In addition to the touch input device, hard keys such as push buttons may be included.

The image sensing portion 83 includes an image sensing element, a lens and the like (all of which are unillustrated), and senses an image of (shoots) a subject based on an operation performed by the user. In the image forming system Sys according to the present disclosure, the image sensing portion 83 senses an image of the multifunctional peripheral 100. Then, the image sensing data is transmitted to the multifunctional peripheral 100 and is subjected to image processing in the image processing portion 12, and thereafter the relative position identification portion 13 identifies the relative position of the personal digital assistant 200 with respect to the multifunctional peripheral 100. The relative position identification portion 13 may identify the relative position of the multifunctional peripheral 100 with respect to the personal digital assistant 200.

The wireless connection portion 85 is connected to the communication portion 7 of the multifunctional peripheral 100, and transmits and receives data to and from the communication portion 7. The wireless connection portion 85 may be directly and wirelessly connected to the communication portion 7 or may be connected through a device such as a wireless hub. When the wireless connection portion 85 is connected through the device such as the wireless hub, the wireless connection portion 85 may be connected through the same network as the computer 300, the server 400 and the facsimile device 500 described above. In the present embodiment, the wireless connection portion 85 and the communication portion 7 are connected by the utilization of short-range wireless communication, and for example, it is assumed that when the personal digital assistant 200 is moved close to the multifunctional peripheral 100, the connection is automatically started.

(Identification of Relative Position of Personal Digital Assistant 200)

A method of identifying the relative position of the personal digital assistant 200 with respect to the multifunctional peripheral 100 will be described.

Figure 3:
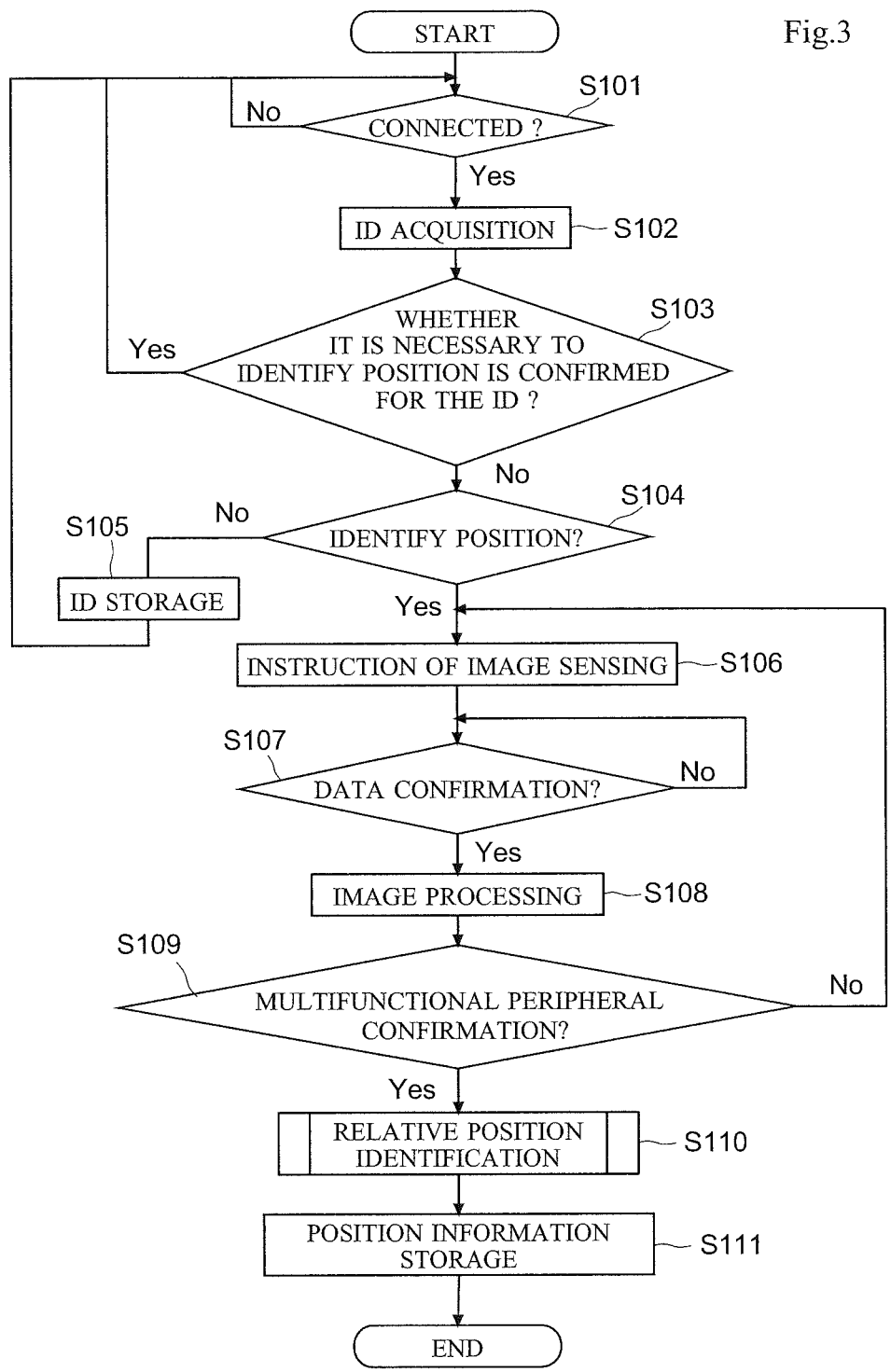
FIG. 3 is a flowchart showing a procedure for identifying a relative position and producing a display on a display portion.

FIG. 3 is a flowchart showing the flow of the identification of a relative position. As shown in FIG. 3, the control portion 1 of the multifunctional peripheral 100 confirms whether or not the communication portion 7 is connected to the wireless connection portion 85 of the personal digital assistant 200 (step S101). In the following description, the connection of the communication portion 7 of the multifunctional peripheral 100 and the wireless connection portion 85 of the personal digital assistant 200 may be simply referred to as the connection of the multifunctional peripheral 100 and the personal digital assistant 200.

When the multifunctional peripheral 100 and the personal digital assistant 200 are not connected (no in step S101), the control portion 1 determines that the personal digital assistant 200 is not present near the multifunctional peripheral 100. Then, the control portion 1 repeats the confirmation of the connection (in other words, step S101) until the connection of the multifunctional peripheral 100 and the personal digital assistant 200 is detected.

When the communication portion 7 confirms the connection to the wireless connection portion 85 of the personal digital assistant 200 (yes in step S101), the control portion 1 acquires the individual identification ID of the personal digital assistant 200 (step S102). Then, the control portion 1 confirms with the personal digital assistant 200 of the acquired individual identification ID whether or not a confirmation as to whether or not it is necessary to identify the relative position has been performed for a predetermined time (for example, a time from a few minutes before now until now) (step S103). In this way, it is possible to reduce the frequency of the confirmation as to whether or not it is necessary to identify the relative position with respect to the same personal digital assistant 200, and thus it is possible to reduce the annoyance of the user. When the confirmation as to whether or not it is necessary to identify the relative position has been performed (yes in step S103), the control portion 1 repeats the confirmation of the connection of the multifunctional peripheral 100 and the personal digital assistant 200 (in other words, step S101).

Figure 4:
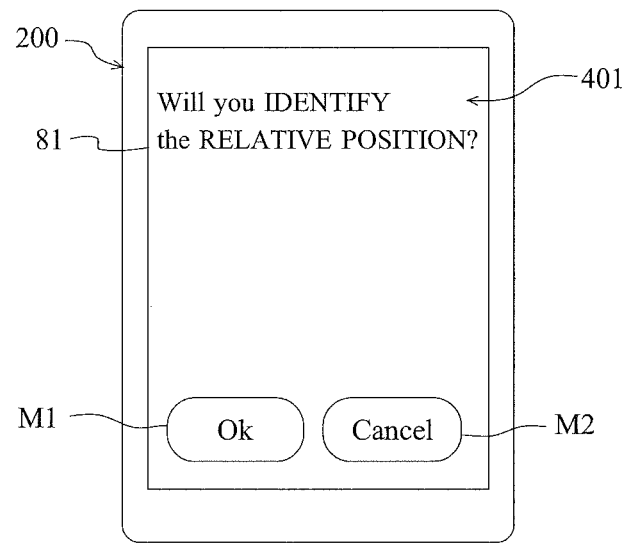
FIG. 4 is a diagram showing the display portion of the personal digital assistant.

When the confirmation as to whether or not it is necessary to identify the relative position has not been performed for the predetermined time (no in step S103), the control portion 1 confirms with the personal digital assistant 200 of the acquired individual identification ID whether or not the relative position is identified (step S104). When a confirmation from the control portion 1 is sent, the control portion 8 of the personal digital assistant 200 displays, on the display portion 81, a question screen for the user as shown in FIG. 4. FIG. 4 is a diagram showing the display portion 81 of the personal digital assistant 200. As shown in FIG. 4, on the display portion 81 of the personal digital assistant 200, a message 401 such as "Will you identify the relative position?", an OK button M1, and a cancel button M2 are displayed. It is assumed that in the personal digital assistant 200, a function (for example, an application) capable of displaying the message from the multifunctional peripheral 100 is included.

When the cancel button M2 is operated by the user (no in step S104), the control portion 1 associates the individual identification ID of the personal digital assistant 200 to which the confirmation is transmitted with the time at which the confirmation is transmitted, and stores the information thereof in the storage portion 3 (step S105). Then, the control portion 1 returns to the confirmation of the connection to the personal digital assistant 200 (the process returns to step S101).

Figure 5:
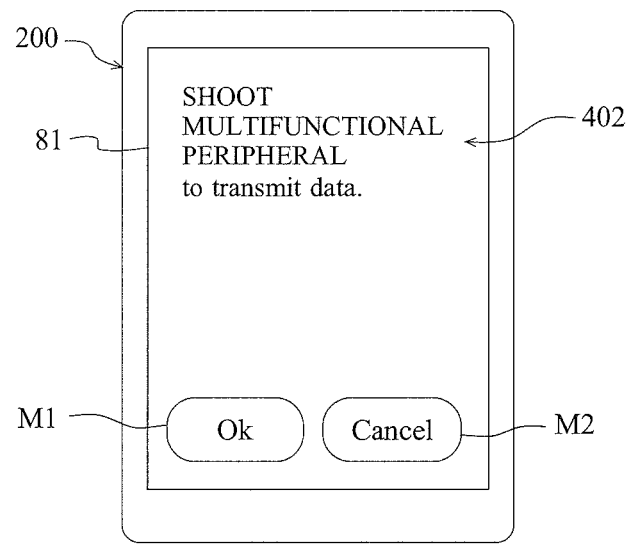
FIG. 5 is a diagram showing the display portion of the personal digital assistant.

When the OK button M1 is operated by the user (yes in step S104), the control portion 1 determines that the user selects the identification of the relative position. Then, the control portion 1 includes an instruction to the personal digital assistant 200 to produce a display for prompting the user to shoot the multifunctional peripheral 100 with the image sensing portion 83 of the personal digital assistant 200 (step S106). As shown in FIG. 5, as the display for prompting the user to shoot the multifunctional peripheral 100 with the image sensing portion 83 of the personal digital assistant 200, for example, a display of a message 402 such as "Shoot multifunctional peripheral to transmit data." can be mentioned.

The control portion 1 confirms whether or not the image sensing data of the multifunctional peripheral 100 is transmitted from the personal digital assistant 200 (step S107). When the transmission of the image sensing data is not confirmed (no in step S107), the control portion 1 repeats the confirmation of the transmission of the image sensing data until the image sensing data is confirmed (step S107). When the transmitted image sensing data is confirmed (yes in step S107), the control portion 1 performs image processing on the image sensing data with the image processing portion 12 so as to identify the sensed multifunctional peripheral 100 within the image sensing data (step S108).

The control portion 1 confirms whether or not the image processing portion 12 has been able to identify the multifunctional peripheral 100 within the image sensing data (step S109). When the control portion 1 has not been able to confirm the multifunctional peripheral 100 (no in step S109), the control portion 100 performs the process again from the transmission of the instruction of the image sensing (step S106). When the process is performed again, for example, as with a message 420 such as "Since the multifunctional peripheral has not been able to be identified, shoot the multifunctional peripheral again." shown in FIG. 15 which will be described later, the user may be prompted to perform the process again.

When the multifunctional peripheral 100 has been able to be identified within the image sensing data (yes in step S109), the control portion 1 starts up the relative position identification portion 13 so as to identify, from the sensed image of the identified multifunctional peripheral 100, the relative position of the personal digital assistant 200 with respect to the multifunctional peripheral 100 (step S110). The details of steps of identifying the relative position will be described later.

In this way, the image forming system Sys identifies the relative position of the personal digital assistant 200, that is, the user with respect to the multifunctional peripheral 100. Then, the control portion 1 of the multifunctional peripheral 100 associates the position of the personal digital assistant 200 with respect to the multifunctional peripheral 100 with the ID for identifying the personal digital assistant 200, and stores the information thereof in the storage portion 3 (step S111).

Figure 6:
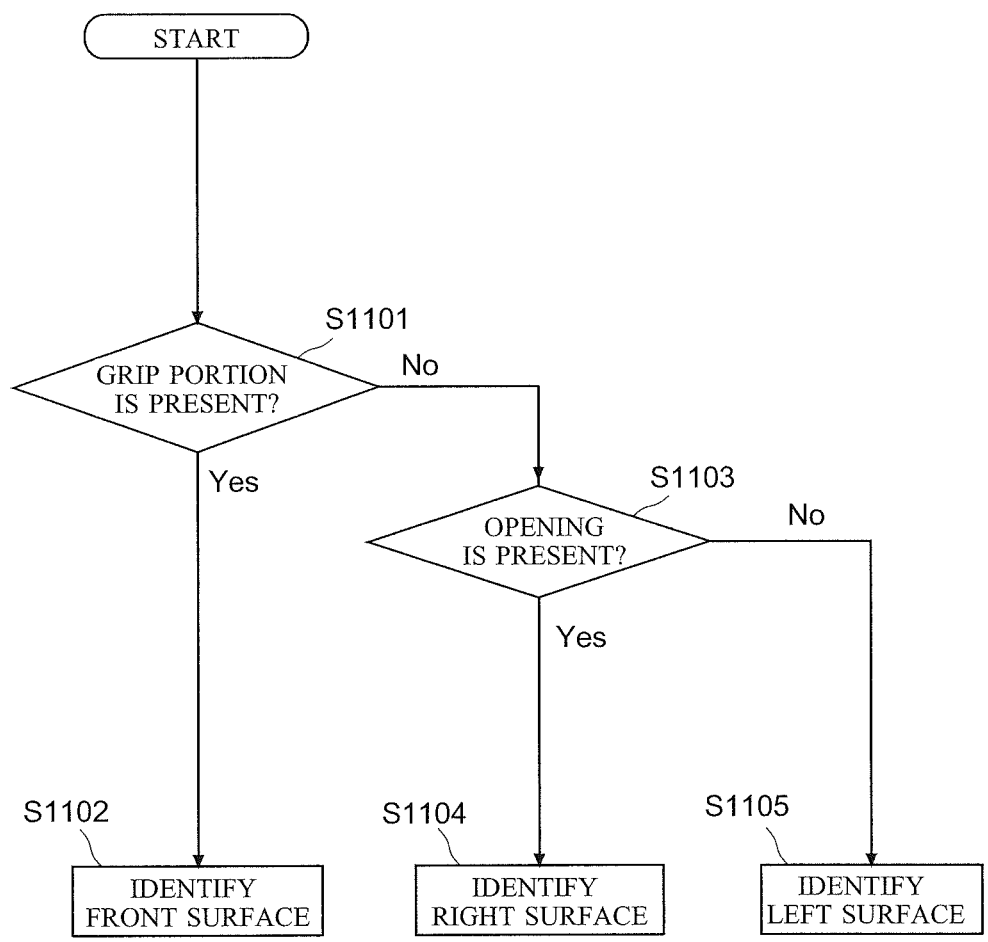
FIG. 6 is a flowchart showing a procedure for identifying the relative position.
Figure 7:
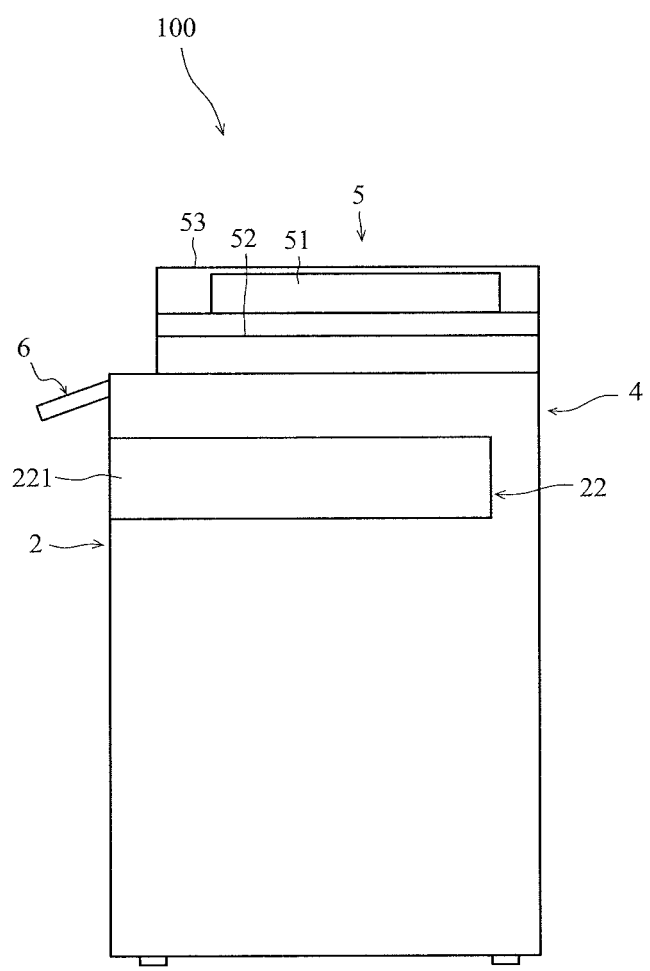
FIG. 7 is a schematic diagram when an image of the multifunctional peripheral is sensed from a right side.
Figure 8:
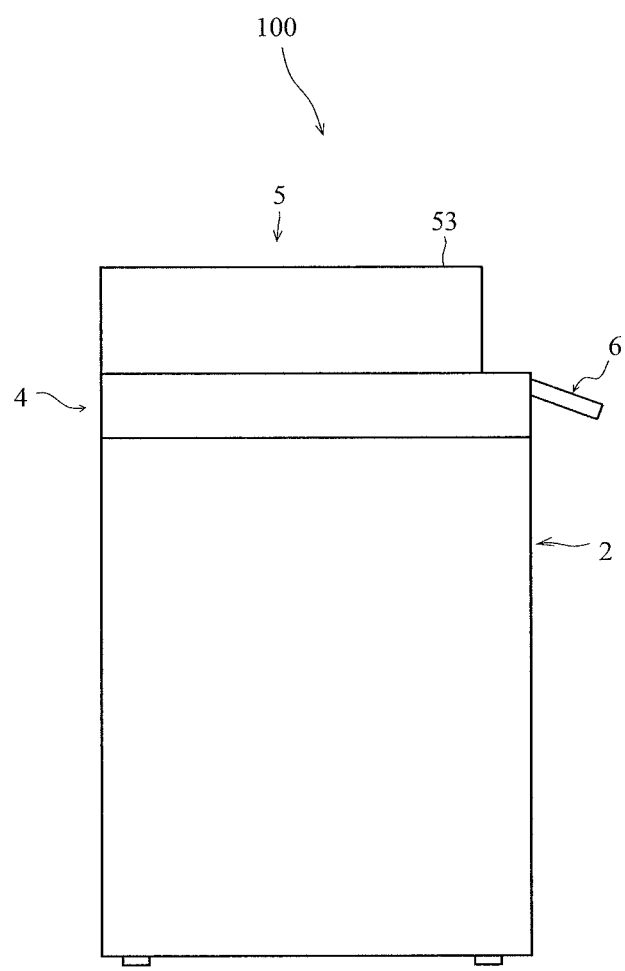
FIG. 8 is a schematic diagram when an image of the multifunctional peripheral is sensed from a left side.

A method of identifying the relative position of the personal digital assistant 200 with respect to the multifunctional peripheral 100 will then be described using a specific example. The method of identifying the relative position which will be described below is an example. FIG. 6 is a flowchart showing a procedure for identifying the relative position. FIG. 7 is a schematic diagram when an image of the multifunctional peripheral 100 is sensed from the right side. FIG. 8 is a schematic diagram when an image of the multifunctional peripheral 100 is sensed from the left side. For a diagram of an image which is sensed from the front surface, see FIG. 2.

As shown in FIGS. 2, 7 and 8, the front surface, the right surface and the left surface of the multifunctional peripheral 100 are shot such that the shapes and the configurations thereof differ from each other. For example, as shown in FIG. 2, in the image sensed from the front surface, the grip portions 211 of the paper feed cassettes 21 are appeared. As shown in FIG. 7, in the image sensed from the right side, the opening 221 of the ejection tray 22 is appeared. Furthermore, in the image sensed from the left side, characteristic portions such as the grip portion 211 and the opening 221 are not appeared. The grip portion 211 is the characteristic portion which identifies the front surface of the multifunctional peripheral 100, and the opening 221 is the characteristic portion which identifies the right surface of the multifunctional peripheral 100.

The relative position identification portion 13 of the multifunctional peripheral 100 identifies, from the image of the multifunctional peripheral 100 identified by the image processing portion 12, based on whether or not the characteristic portion as described above is present, an angle of view in which the image sensing data is sensed, and identifies, from the angle of view, the position in which the image sensing is performed with respect to the multifunctional peripheral 100, that is, the relative position of the personal digital assistant 200 with respect to the multifunctional peripheral 100. Although in the present embodiment, the image processing portion 12 and the relative position identification portion 13 are described separately, they may actually be integral.

A procedure, based on what has been described above, for identifying the relative position of the personal digital assistant 200 with respect to the multifunctional peripheral 100 and displaying the relative position on the display portion of the personal digital assistant 200 will be described. The flowchart of FIG. 6 shows the details of the processing in step S110 of the flowchart shown in FIG. 3, and is included in the processing shown in FIG. 3.

As shown in FIG. 6, the relative position identification portion 13 confirms whether or not the grip portion 211 is appeared in the image of the multifunctional peripheral 100 (step S1101). When the grip portion 211 is appeared (yes in step S1101), the grip portion 211 is the identification portion for the front surface, and thus the relative position identification portion 13 identifies the relative position of the personal digital assistant 200 with respect to the multifunctional peripheral 100 as the front side of the multifunctional peripheral 100 (step S1102).

When the grip portion 211 is not appeared in the image of the multifunctional peripheral 100 (no in step S1101), the relative position identification portion 13 confirms whether or not the opening 221 of the ejection tray 22 is appeared in the image of the multifunctional peripheral 100 (step S1103). When the opening 221 is appeared in the image of the multifunctional peripheral 100 (yes in step S1103), the opening 221 is the identification portion for the right surface, and thus the relative position identification portion 13 identifies the relative position of the personal digital assistant 200 with respect to the multifunctional peripheral 100 as the right side of the multifunctional peripheral 100 (step S1104). When the opening 221 is not appeared (no in step S1103), the identification portion is not included in the image of the multifunctional peripheral 100, and thus the relative position identification portion 13 identifies the relative position of the personal digital assistant 200 with respect to the multifunctional peripheral 100 as the left side of the multifunctional peripheral 100 (step S1105).

As described above, the image processing portion 12 and the relative position identification portion 13 in the control portion 1 are utilized, and thus the relative position of the personal digital assistant 200 with respect to the multifunctional peripheral 100 is identified. Although in the identification of the relative position described above, the front side, the right side and the left side of the multifunctional peripheral 100 are identified, there is no limitation to this configuration, and processing for identifying the back side of the multifunctional peripheral 100 may be performed. In this case, the left surface or the back surface of the multifunctional peripheral 100 preferably has any characteristic portion. The surfaces described above may be determined by the outside shape of the multifunctional peripheral 100. In this case, the characteristic portion is the outside shape of the multifunctional peripheral 100. Although for the distinguishment of the characteristic portions described above, a method in which the image data of the multifunctional peripheral 100 stored in the storage portion 3 of the multifunctional peripheral 100 is checked can be mentioned, there is no limitation to this method.

In the image forming system Sys, based on information on the relative position of the personal digital assistant 200 identified by the multifunctional peripheral 100 with respect to the multifunctional peripheral 100, the position and the direction of the contact glass 41 and the position and the direction of the original document set on the contact glass 41 seen from the user (who carries the identified personal digital assistant 200) can be displayed in the personal digital assistant 200. A procedure for displaying, on the display portion 81 of the personal digital assistant 200, the positions and the directions of the contact glass 41 and the original document set on the contact glass 41 will be described below.

Figure 9:
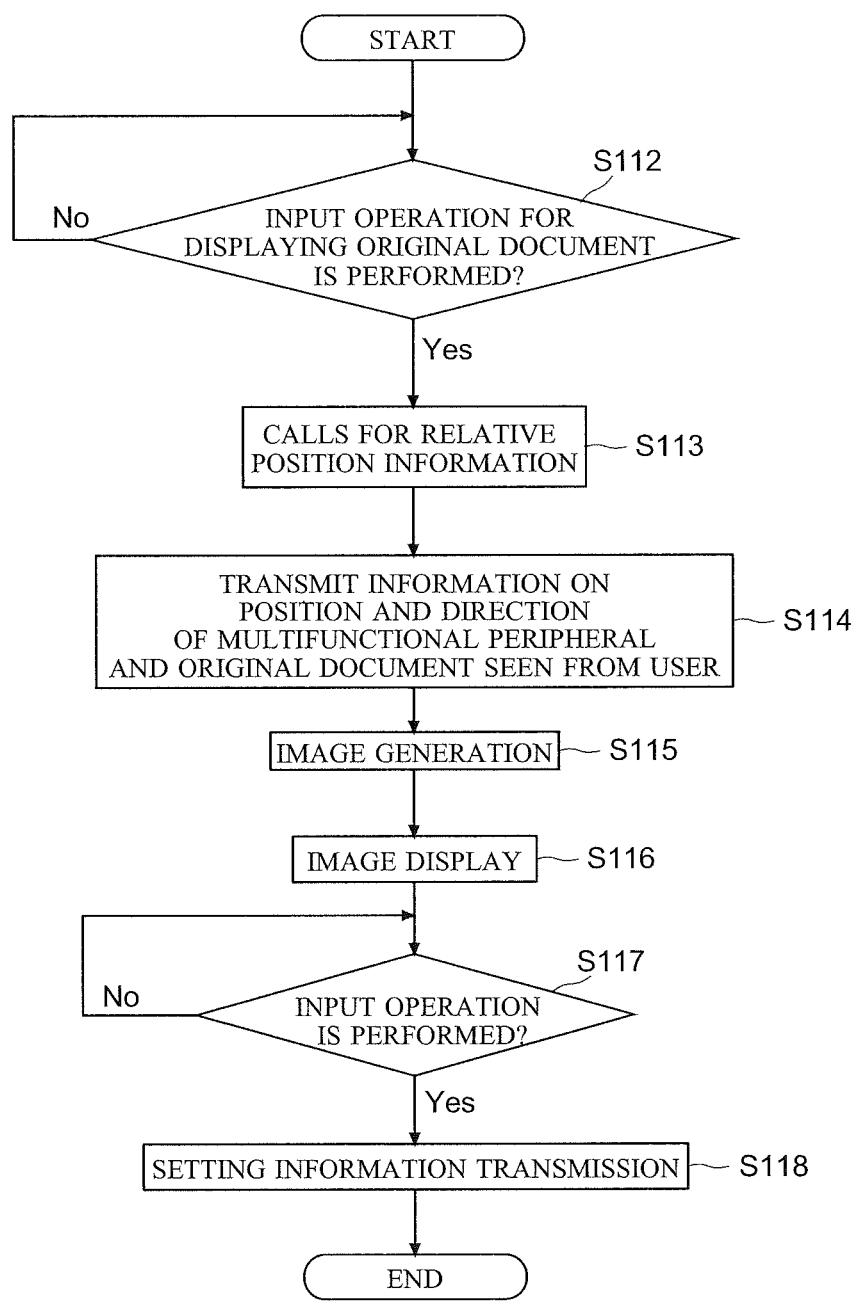
FIG. 9 is a flowchart showing a procedure for displaying, on the display portion of the personal digital assistant, the multifunctional peripheral and an original document seen from a user.

FIG. 9 is a flowchart showing a procedure for displaying, on the display portion of the personal digital assistant, the multifunctional peripheral and the original document seen from the user.

As shown in FIG. 9, whether or not an input operation for displaying the images of the multifunctional peripheral 100 and the original document seen from the user is performed on the personal digital assistant 200 is confirmed (step S112). Although the procedure for the image display is described separately from the procedure for the relative position (as shown in FIG. 3), the procedure for the image display may actually be performed after the relative position of the personal digital assistant 200 with respect to the multifunctional peripheral 100 is identified. When the procedure for the image display is directly performed, the procedure for the image display may be performed with the omission of the storage of the position information (step S111 in FIG. 3).

When the input operation for displaying the images of the positions and the directions of the contact glass 41 and the original document seen from the user is not performed on the personal digital assistant 200 (no in step S112), the confirmation of the input operation (step S112) is repeated. When the input operation is not performed or when the input operation is not performed for a certain period, it is assumed that the display is not performed, and thus the processing may be completed.

When the input operation for displaying the images of the positions and the directions of the contact glass 41 and the original document seen from the user is performed on the personal digital assistant 200 (yes in step S112), the control portion 1 receives information indicating that the input operation is received in the personal digital assistant 200. Then, the control portion 1 calls for, from the storage portion 3, the information on the relative position of the personal digital assistant 200 with respect to the multifunctional peripheral 100 (step S113). Then, based on the relative position of the personal digital assistant 200 with respect to the multifunctional peripheral 100, the information on the position and the direction of the contact glass 41 and the information on the position and the direction of the original document set on the contact glass 41 when seen from the user carrying the personal digital assistant 200 are transmitted to the personal digital assistant 200 (step S114). The control portion 8 of the personal digital assistant 200 generates, from the information on the position and the direction of the contact glass 41 and the information on the position and the direction of the original document set on the contact glass 41 seen from the user, the images displayed on the display portion 81 (step S115). The generated images are displayed on the display portion 81 (step S116).

Although in the present embodiment, the control portion 8 of the personal digital assistant 200 generates the images displayed on the display portion 81, there is no limitation to this configuration. For example, images in which the multifunctional peripheral 100 and the original document are combined are previously prepared, and based on the information on the positions and the directions of the multifunctional peripheral 100 and the original document seen from the user, these images may be called for and displayed. Although the images displayed on the display portion 81 are generated in the personal digital assistant 200, there is no limitation to this configuration. Based on the relative positions of the multifunctional peripheral 100 and the user, the control portion 1 may generate images and transmit the images to the personal digital assistant 200 together with information on the positions.

Then, after the images are displayed on the display portion 81, the control portion 8 of the personal digital assistant 200 confirms whether or not an input operation such as the selection, the confirmation or the like of a setting is performed by the user (step S117). As the selection and the confirmation of the setting, for example, a determination (selection) as to whether or not the position, the direction and the like of the contact glass 41 displayed in the personal digital assistant 200 are accurate, the confirmation of the position and the direction in which the original document is set on the contact glass 41 and the like can be mentioned. However, there is no limitation to this configuration. When the input operation is not performed (no in step S117), the control portion 8 waits until the input operation is performed (repeats step S117). When the input operation is not performed or when the input operation is not performed for a certain period, the processing itself may be completed.

When the input operation is performed (yes in step S117), the control portion 8 of the personal digital assistant 200 transmits, to the multifunctional peripheral 100, information on the selection and/or the confirmation of the setting performed by the user (step S118). The control portion 1 of the multifunctional peripheral 100 performs processing based on the transmitted information.

As described above, from the relative position of the personal digital assistant 200 with respect to the multifunctional peripheral 100, the image of the position and the direction of the contact glass 41 and the image of the position and the direction of the original document set on the contact glass 41 seen from the user can be displayed on the display portion 81 of the personal digital assistant 200. Then, the user confirms the images displayed on the display portion 81, operates the personal digital assistant 200 and thereby can operate the multifunctional peripheral 100. A configuration may be adopted in which on the personal digital assistant 200, the same operation as on the operation panel 6 can be performed.

When as in the present embodiment, on the image data which is sensed, image processing is performed in the image processing portion 12 of the multifunctional peripheral 100, and thus the relative position is identified in the relative position identification portion 13, the information (image data) on the characteristic portions can be stored in the storage portion 3 of the multifunctional peripheral 100. For example, when the user of the personal digital assistant 200 works in a plurality of offices, in the individual offices, different multifunctional peripherals 100 may be used. Even in this case, information on all the characteristic portions in the multifunctional peripherals 100 does not need to be stored in the storage portion 84 of the personal digital assistant 200.

(Displayed Image)

Figure 10:
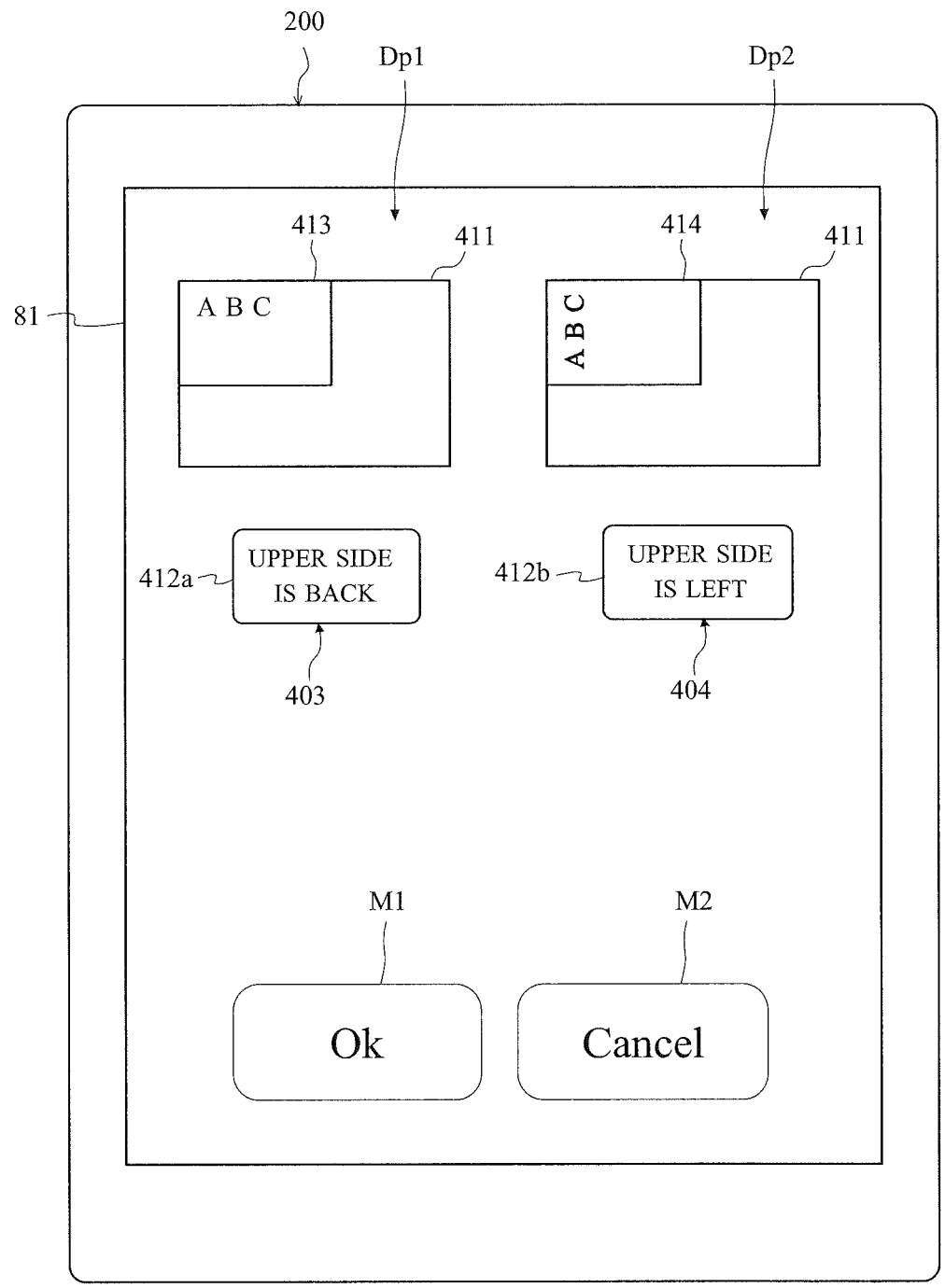
FIG. 10 is image data which is displayed on the display portion when the relative position of the personal digital assistant with respect to the multifunctional peripheral is the front surface.
Figure 11:
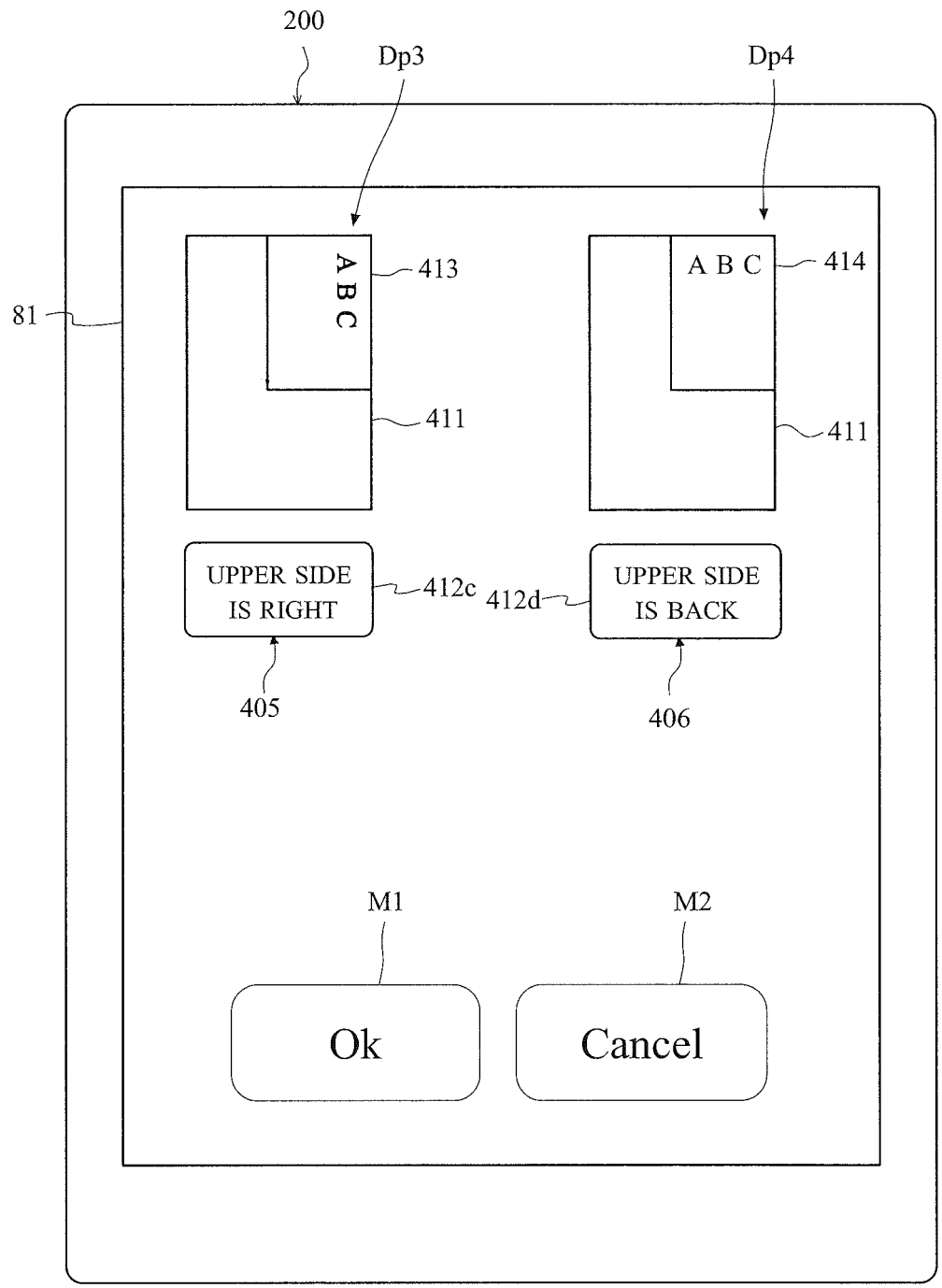
FIG. 11 is image data which is displayed on the display portion when the relative position of the personal digital assistant with respect to the multifunctional peripheral is the right side.
Figure 12:
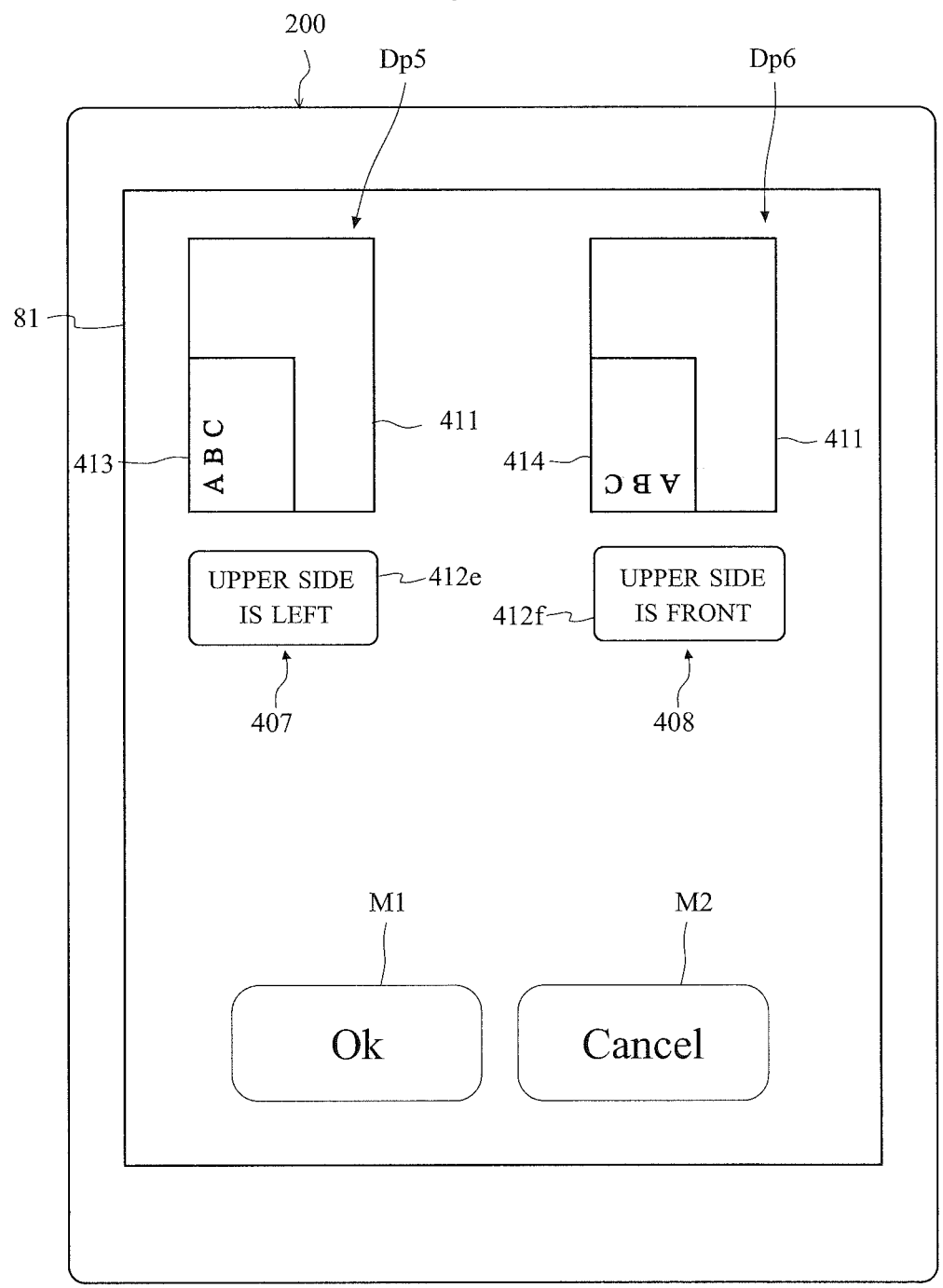
FIG. 12 is image data which is displayed on the display portion when the relative position of the personal digital assistant with respect to the multifunctional peripheral is the left side.

Image data displayed on the display portion 81 of the personal digital assistant 200 will then be described with reference to drawings. FIG. 10 shows image data which is displayed on the display portion when the relative position of the personal digital assistant 200 with respect to the multifunctional peripheral 100 is the front side. FIG. 11 shows image data which is displayed on the display portion when the relative position of the personal digital assistant 200 with respect to the multifunctional peripheral 100 is the right side. FIG. 12 shows image data which is displayed on the display portion when the relative position of the personal digital assistant 200 with respect to the multifunctional peripheral 100 is the left side. The generation of the image displayed on the display portion 81 is assumed to be performed in the control portion 8 of the personal digital assistant 200. FIGS. 10 to 12 show the state where the image is displayed on the display portion 81.

In the storage portion 84, a schematic image 411 of the contact glass 41, a schematic image 413 of a horizontally long original document and a schematic image 414 of a vertically long original document are stored. As shown in FIG. 10 and the like, the schematic image 411 of the contact glass 41 is rectangular. Both the schematic image 413 of the horizontally long original document and the schematic image 414 of the vertically long original document are rectangular. Here, with respect to the vertically long original document and the horizontally long original document, when the original document is rotated such that the characters thereof are in the vertically right direction, the original document which has a long vertical side when seen from the user is assumed to be the vertically long original document, and the original document which has a long horizontal side is assumed to be the horizontally long original document.

When it is determined that the personal digital assistant 200 is in front of the multifunctional peripheral 100, the control portion 8 calls for, from the storage portion 84, the schematic image 411 of the contact glass 41 and arranges it such that the back side is the upper side, that is, that the schematic image 411 is horizontally long. Then, the control portion 1 generates image data Dp1 in which the schematic image 413 of the horizontally long original document is arranged so as to be brought into close contact with the upper left corner of the schematic image 411 of the contact glass 41. The image data Dp1 is a plan view showing the position and the direction of the contact glass 41 and the position and the direction of the original document seen from the personal digital assistant 200 whose relative position with respect to the multifunctional peripheral 100 is identified.

In the schematic image 413 of the horizontally long original document, a character image such as "ABC" is included, and the direction of the original document is specified by the character image. When as shown in FIG. 10, the personal digital assistant 200 is in front of the multifunctional peripheral 100, the horizontally long original document is arranged such that the upper portion of the character image is directed upward.

Then, image data Dp2 is produced in which the schematic image 411 of the contact glass 41 and the schematic image 414 of the vertically long original document are combined. As in the horizontally long original document, in the schematic image 414 of the vertically long original document, a character image such as "ABC" is included. Then, the schematic image 414 of the vertically long original document is brought into close contact with the upper left corner of the schematic image 411 of the contact glass 41, and is arranged such that the upper portion of the character image is directed leftward.

The control portion 8 prepares the two types of image data Dp1 and Dp2 described above and displays the image data Dp1 and Dp2 in an upper portion of the display portion 81. Although in FIG. 10, the image data Dp1 and the image data Dp2 are displayed so as to be aligned laterally in the upper portion of the display portion 81, they may be displayed so as to be aligned vertically on the display portion 81. Although the image data Dp1 and the image data Dp2 are displayed simultaneously, there is no limitation to this display. For example, the image data Dp1 and the image data Dp2 may be displayed so as to be switched at regular time intervals.

In the display portion 81, below the portion where the image data Dp1 is displayed, a setting key 412a is displayed. The setting key 412a is a setting key which is operated when the image data Dp1 is selected. The setting key 412a is operated, and thus the image data Dp1 is selected. In other words, the setting key 412a is operated, and thus a setting is selected in which the user is in front of the multifunctional peripheral 100 and in which the horizontally long original document is set on the contact glass 41. In order for the position and the direction of the original document to be more accurate, a message 403 of "Upper side is back" is displayed so as to overlap the setting key 412a.

In the display portion 81, below the portion where the image data Dp2 is displayed, a setting key 412b is displayed. The setting key 412b is a setting key which is operated when the image data Dp2 is selected. The setting key 412b is operated, and thus the image data Dp2 is selected. In other words, the setting key 412b is operated, and thus a setting is selected in which the user is in front of the multifunctional peripheral 100 and in which the vertically long original document is set on the contact glass 41. In order for the position and the direction of the original document to be more accurate, a message 404 of "Upper side is left" is displayed so as to overlap the setting key 412b. On the display portion 81, below the setting key 412a and the setting key 412b, the OK button M1 and the cancel button M2 are also displayed.

After the selection of the setting key 412a or the setting key 412b, the OK button M1 is operated, and thus information on the direction of the original document is transmitted from the personal digital assistant 200 to the multifunctional peripheral 100. After the selection of the setting key 412a or the setting key 412b, the cancel button M2 is operated, and thus the setting is cancelled such that the process returns to the selection. Furthermore, in a state where neither the setting key 412a nor the setting key 412b is selected, the cancel button M2 is operated, and thus the setting itself is stopped (cancelled).

Here, the OK button M1, the cancel button M2, the setting key 412a and the setting key 412b are so-called touch keys, and a finger of the user, a touch pen or the like is brought into contact therewith such that the input operation is received. As described above, in the image forming system Sys according to the present disclosure, based on the position of the user with respect to the multifunctional peripheral 100, the position and the direction in which the original document is set on the contact glass 41 are indicated to the user. Then, after the user sets the original document, the input operation on the setting key displayed in the personal digital assistant 200 is received, and thus the position and the direction in which the original document is set on the contact glass 41 can be set for the control portion 1.

Although in the present embodiment, the example is described where the arrangement position of the original document on the contact glass 41 is the same and where the direction of the original document is different, there is no limitation to this example. For example, an image in which the position of the original document on the contact glass 41 is different, an image in which the direction of the original document is different and the like are combined, with the result that a larger number of images may be displayed. Instead of the images, only characters such as "Upper left and leftward direction" may be displayed. Moreover, so-called highlighting in which the color of the background is changed at the time of selection without provision of the setting keys is performed, and thus a determination may be made such as by the operation of the OK button M1 or double clicking.

Although in FIG. 10, the example where the user is in front of the multifunctional peripheral 100 is described, similar displays are produced when the user is on the right side of the multifunctional peripheral (see FIG. 11) and when the user is on the left side of the multifunctional peripheral (see FIG. 12).

The display portion 81 shown in FIG. 11 shows a case where the personal digital assistant 200 is on the right side of the multifunctional peripheral 100. When the personal digital assistant 200 is on the right side of the multifunctional peripheral 100, the front surface of the multifunctional peripheral 100 appears on the left side when seen from the user. Hence, the control portion 8 arranges, in image data Dp3 and Dp4, the front surface of the schematic image 411 of the contact glass 41 on the left side, that is, arranges the schematic image 411 such that the schematic image 411 is vertically long.

Since the image data Dp3 is image data which shows the state where the horizontally long original document is placed, the schematic image 413 of the horizontally long original document is displayed such that the upper portion of the character image thereof is directed rightward and that the schematic image 413 is brought into close contact with the upper right corner of the schematic image 411 of the contact glass 41. Since the image data Dp4 is image data which shows the state where the vertically long original document is placed, the schematic image 414 of the vertically long original document is displayed such that the upper portion of the character image thereof is directed upward and that the schematic image 414 is brought into close contact with the upper right corner of the schematic image 411 of the contact glass 41.

In the display portion 81, below the portion where the image data Dp3 is displayed, a setting key 412c is displayed. The setting key 412c is a setting key which is operated when the image data Dp3 is selected. In order for the position and the direction of the original document to be more accurate, a message 405 of "Upper side is right" is displayed so as to overlap the setting key 412c.

In the display portion 81, below the portion where the image data Dp4 is displayed, a setting key 412d is displayed. The setting key 412d is a setting key which is operated when the image data Dp4 is selected. In order for the position and the direction of the original document to be more accurate, a message 406 of "Upper side is back" is displayed so as to overlap the setting key 412*d*. On the display portion 81 shown in FIG. 11, below the setting keys 412*c* and 412*d*, the OK button M1 and the cancel button M2 are also displayed.

An operation when the setting key 412*c* and the setting key 412*d* are operated and an operation method are substantially the same as the operation of the setting key 412*a* and the setting key 412*b* except that the image data to be selected is different, and thus the details thereof are omitted.

The display portion 81 shown in FIG. 12 shows a case where the personal digital assistant 200 is on the left side of the multifunctional peripheral 100. When the personal digital assistant 200 is on the left side of the multifunctional peripheral 100, the front surface of the multifunctional peripheral 100 appears on the right side when seen from the user. Hence, the control portion 8 arranges, in image data Dp5 and Dp6, the front surface of the schematic image 411 of the contact glass 41 on the left side, that is, arranges the schematic image 411 such that the schematic image 411 is vertically long.

Since the image data Dp5 is image data which shows the state where the horizontally long original document is placed, the schematic image 413 of the horizontally long original document is displayed such that the upper portion of the character image thereof is directed leftward and that the schematic image 413 is brought into close contact with the lower left corner of the schematic image 411 of the contact glass 41. Since the image data Dp6 is image data which shows the state where the vertically long original document is placed, the schematic image 414 of the vertically long original document is displayed such that the upper portion of the character image thereof is directed downward and that the schematic image 414 is brought into close contact with the lower left corner of the schematic image 411 of the contact glass 41.

In the display portion 81, below the portion where the image data Dp5 is displayed, a setting key 412*e* is displayed. The setting key 412*e* is a setting key which is operated when the image data Dp5 is selected. In order for the position and the direction of the original document to be more accurate, a message 407 of "Upper side is left" is displayed so as to overlap the setting key 412*e*.

In the display portion 81, below the portion where the image data Dp6 is displayed, a setting key 412*f* is displayed. The setting key 412*f* is a setting key which is operated when the image data Dp6 is selected. In order for the position and the direction of the original document to be more accurate, a message 408 of "Upper side is front" is displayed so as to overlap the setting key 412*f*. On the display portion 81 shown in FIG. 12, below the setting key 412*e* and the setting key 412*f*, the OK button M1 and the cancel button M2 are also displayed.

An operation when the setting key 412*e* and the setting key 412*f* are operated and an operation method are substantially the same as the operation of the setting key 412*a* and the setting key 412*b* except that the image data to be selected is different, and thus the details thereof are omitted.

The image data Dp1 to Dp6 generated as described above is displayed on the display portion 81 of the personal digital assistant 200, and thus the user can accurately confirm the position and the direction of the original document set on the contact glass 41. The input operation for the setting keys 412*a* to 412*f* is performed, and thus it is possible to complete the setting for the arrangement position and the direction of the original document. In this way, it is possible to intuitively recognize the arrangement position and the direction of the original document with respect to the contact glass 41, and it is also possible to easily and accurately make the setting for the direction of the original document which is placed.

As described above, in the image forming system Sys, on the display portion 81 of the personal digital assistant 200, the position and the direction of the contact glass 41 and the position and the direction of the original document set on the control portion 1 seen from the user are displayed, and thus it is unlikely that the user sets the original document in a wrong position and in a wrong direction. It is also possible to intuitively select the direction in which the original document is set, and thus it is possible to reduce the inputting of a wrong setting (here, the setting for the position and the direction of the original document).

Although in the present embodiment, the schematic image 411 of the contact glass 41 and the schematic images 413 and 414 of the original document are previously stored in the storage portion 84, and they are combined so as to generate the image data Dp1 to Dp6, there is no limitation to this configuration. For example, the image data Dp1 to Dp6 may be previously stored, and based on information from the multifunctional peripheral 100, the image data may be selected. An image may be generated or selected in the control portion 1 of the multifunctional peripheral 100, transmitted to the personal digital assistant 200 and displayed in the personal digital assistant 200. In this way, it is possible to reduce the amount of information stored in the personal digital assistant 200.

Although in the description of the present embodiment, the image data Dp1 to Dp6 indicates the position and the direction of the original document, there is no limitation to this configuration. For example, information such as the size of the original document which can be printed and colorization (color printing, gray scale printing) may be included. When as described above, a plurality of pieces of information are included in the image data, information may differ depending on the multifunctional peripheral 100. In this case, the image data is also generated in the multifunctional peripheral 100 (the control portion 1), and is transmitted to the personal digital assistant 200, and thus it is possible to reduce the processing in the personal digital assistant 200.

(Variation 1)

In the present embodiment, in the front surface and the right surface of the multifunctional peripheral 100, the characteristic portions are individually included, and the characteristic portions are distinguished by the image processing. However, depending on the surrounding environment or the like, it may be difficult to distinguish the characteristic portions. Hence, a configuration may be adopted in which in the front surface, the right surface and the left surface, different signs (for example, a number, a character, a star mark, a circle mark and a rhombus mark) are individually and previously included, and in which based on information on at least one of the type, the shape and the size of the signs, the relative position of the personal digital assistant 200 with respect to the multifunctional peripheral 100 is identified. On the individual surfaces, a plurality of signs are attached, and thus even when furniture or a person overlaps the signs, it is possible to reliably identify the relative position of the personal digital assistant 200 with respect to the multifunctional peripheral 100. As the item for identifying the surfaces, there is no limitation to the sign. For example, a configuration may be adopted in which the color for each of the surfaces is changed, and in which the color is distinguished such that the surface is identified.

(Variation 2)

In the present embodiment, in the front surface and the right surface of the multifunctional peripheral 100, the characteristic portions are individually included, and the characteristic portions are distinguished by the image processing. Then, by the characteristic portions in the image sensing data displayed in the multifunctional peripheral 100, the front surface and the right surface are identified, and by the fact that there is no characteristic portion, the left surface is identified. Depending on the position in which image sensing is performed by the personal digital assistant 200, the multifunctional peripheral 100 in the image sensing data may include a plurality of characteristic portions. In such a case, the shape and the size of the characteristic portions are distinguished by image processing, and thus it is possible to identify the relative position of the personal digital assistant 200 with respect to the multifunctional peripheral 100. Here, the surrounding of the multifunctional peripheral 100 is divided into the front surface, the right surface and the left surface for each of areas, and in which area the characteristic portion is included is distinguished. Then, image data may be generated by identifying the surface in the area. A configuration may be adopted in which the angle of the position of the personal digital assistant 200 with respect to the center portion of the multifunctional peripheral 100 (the contact glass 41) is identified, and in which image data corresponding to the angle is produced.

Second Embodiment

Figure 13:
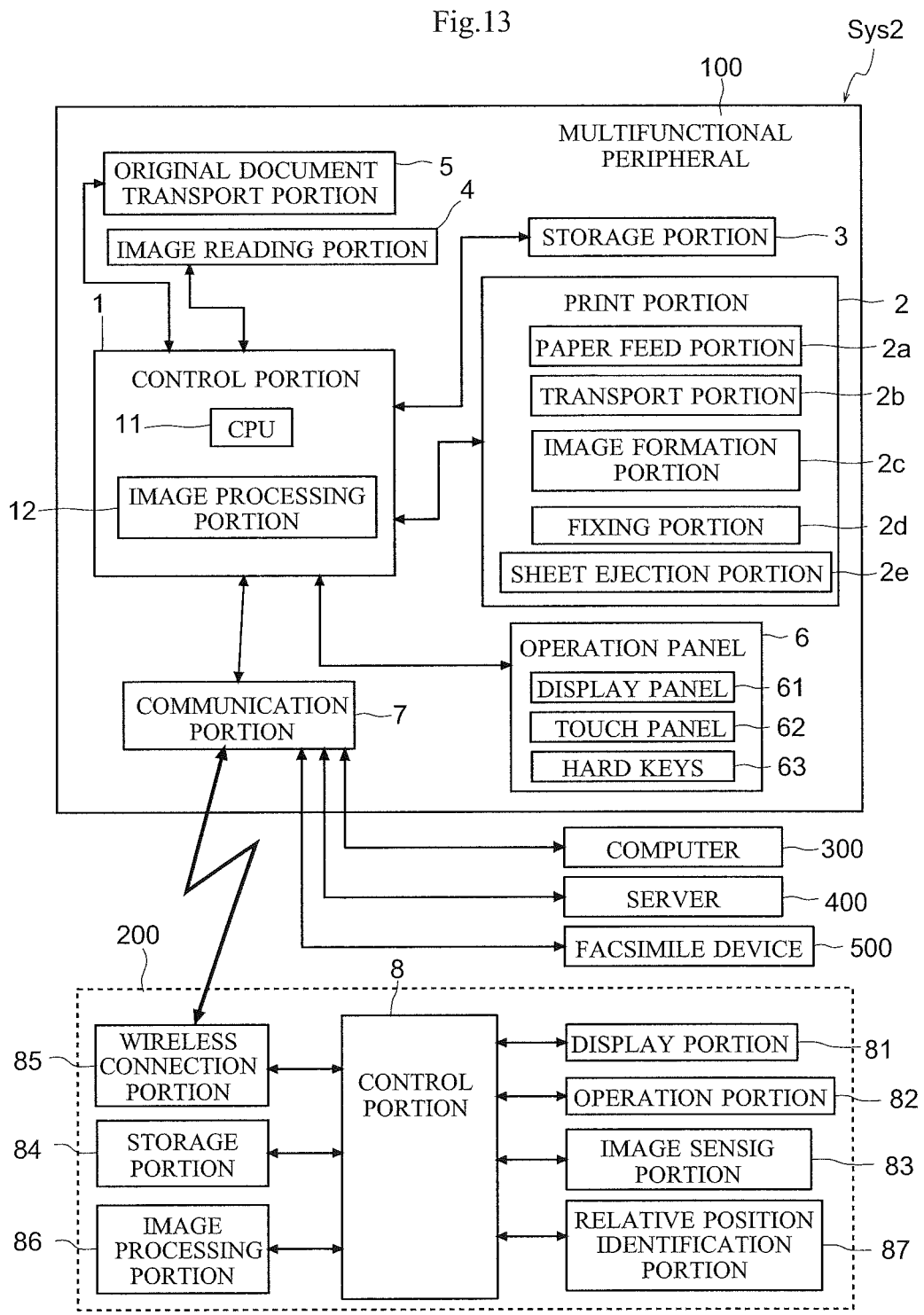
FIG. 13 is a functional block diagram showing a main configuration of another example of the image forming system which includes the multifunctional peripheral and the personal digital assistant according to the present disclosure.

Another example of the image forming system according to the present disclosure will be described with reference to drawings. FIG. 13 is a functional block diagram showing a main configuration of the example of the image forming system which includes the multifunctional peripheral and the personal digital assistant according to the present disclosure. Although the image forming system Sys2 shown in FIG. 13 differs from the image forming system Sys shown in FIG. 1 in that an image processing portion 86 and a relative position identification portion 87 are included in the personal digital assistant 200, the other points are the same as each other and the substantially same portions are identified with the same symbols.

As shown in FIG. 13, in the personal digital assistant 200, the image processing portion 86 and the relative position identification portion 87 are included. The operations of the image processing portion 86 and the relative position identification portion 87 are equivalent to those of the image processing portion 12 and the relative position identification portion 13 included in the multifunctional peripheral 100 of the first embodiment, and thus the detailed description thereof will be omitted.

Figure 14:
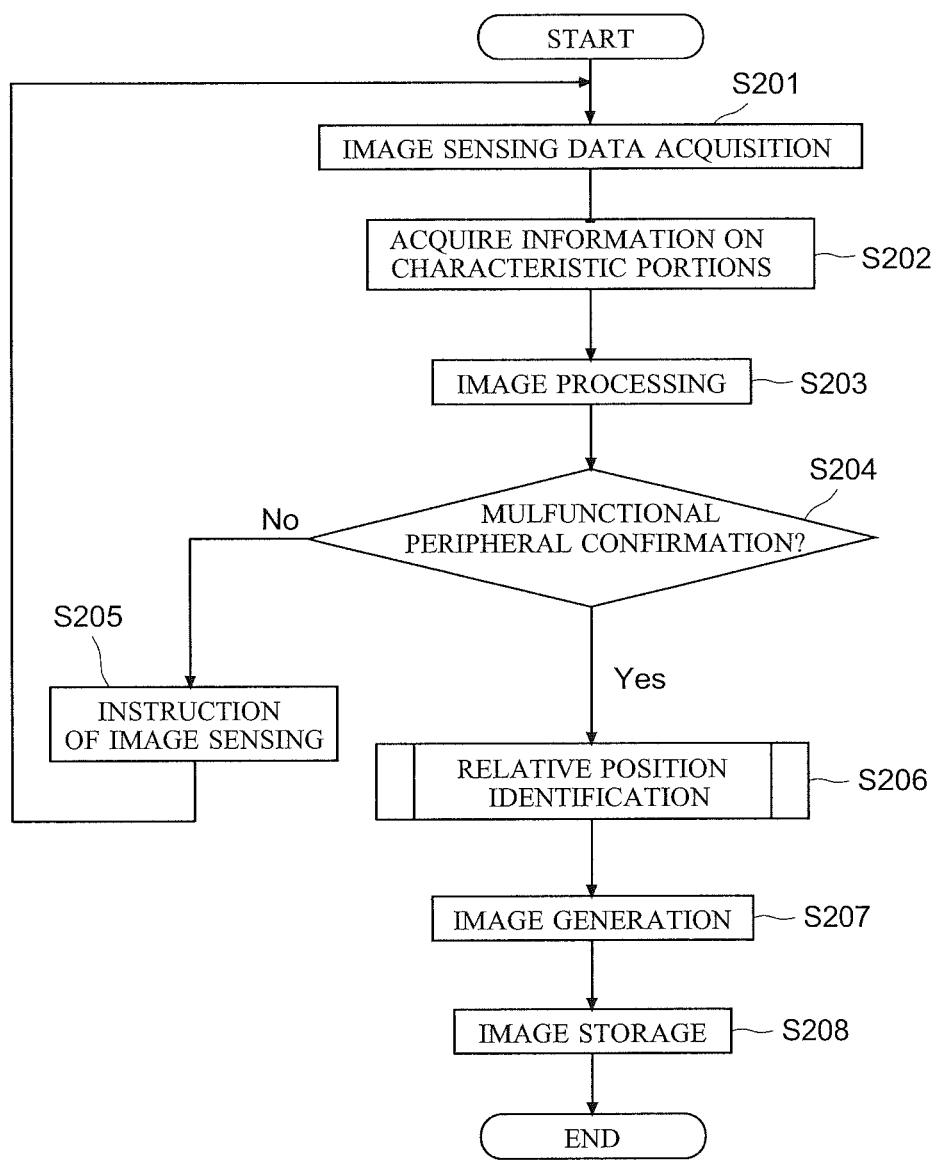
FIG. 14 is a flowchart showing a procedure for identifying the relative position and producing a display on the display portion.

In the present embodiment, the relative position of the personal digital assistant 200 with respect to the multifunctional peripheral 100 is identified in the image processing portion 86 and the relative position identification portion 87 of the personal digital assistant 200. A procedure for identifying the position of the personal digital assistant 200 with respect to the multifunctional peripheral 100 will be described with reference to drawings. FIG. 14 is a flowchart showing the procedure for identifying the relative position.

As shown in FIG. 14, based on the fact that the operation portion 82 is operated by the user, the control portion 8 acquires the image sensing data of the multifunctional peripheral 100 whose relative position is to be identified (step S201). In other words, the user senses an image of the multifunctional peripheral 100 with the personal digital assistant 200, and thereafter the image sensing data is acquired. The control portion 8 acquires, from a server on the Internet or the like, information (such as image information and shapes) on the characteristic portions of the multifunctional peripheral 100 (step S202). When the multifunctional peripheral 100 has the information on the characteristic portions, the personal digital assistant 200 may be connected to the multifunctional peripheral 100 so as to directly acquire the information from the multifunctional peripheral 100. Alternatively, when the information on the characteristic portions of the multifunctional peripheral 100 has already been in the storage portion 84 of the personal digital assistant 200, the step of acquiring the information on the characteristic portions (step S202) can be omitted.

Figure 15:
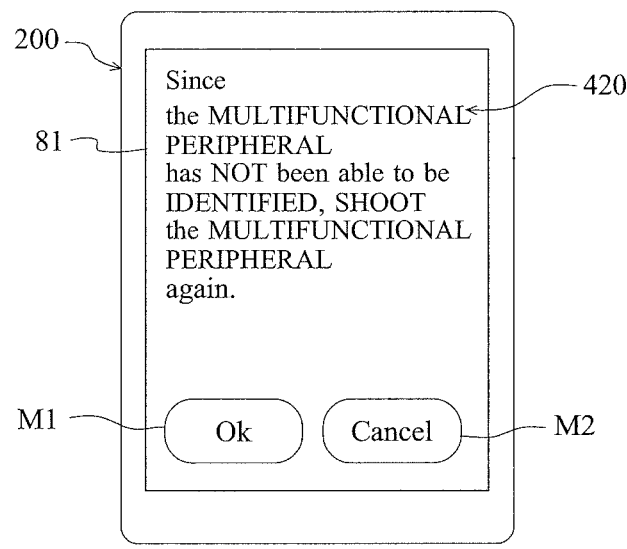
FIG. 15 is a diagram showing the display portion of the personal digital assistant.

Then, the control portion 8 performs, in the image processing portion 86, image processing on the image sensing data so as to identify, within the image sensing data, the multifunctional peripheral 100 whose image is sensed (step S203). The control portion 8 confirms whether or not the image processing portion 86 has been able to identify the multifunctional peripheral 100 within the image sensing data (step S204). When the multifunctional peripheral 100 has not been able to be confirmed (no in step S204), the multifunctional peripheral 100 transmits an instruction of the image sensing (step S205). When the image sensing is performed again, as shown in FIG. 15, a message 420 such as "Since the multifunctional peripheral has not been able to be identified, shoot the multifunctional peripheral again." is displayed. Then, after a certain period of time, the mode may be switched to an image sensing mode (camera mode). After the transmission of the instruction of the image sensing, the process returns to the acquisition of the image sensing data (step S201).

When the multifunctional peripheral 100 has been able to be identified within the image sensing data (yes in step S204), the control portion 8 starts up the relative position identification portion 87 so as to identify, from the sensed image of the identified multifunctional peripheral 100, the relative position of the personal digital assistant 200 with respect to the multifunctional peripheral 100 (step S206). In step S206, the processing shown in the flow of FIG. 6 may be performed or processing as described in variation 1 or 2 of the first embodiment may be performed.

Based on information on the relative position of the personal digital assistant 200 with respect to the multifunctional peripheral 100, image data (the image data Dp1 to Dp6 shown in FIGS. 10 to 12) indicating the positions of the contact glass 41 and the original document in the multifunctional peripheral 100 is generated (step S207) and is stored in the storage portion 84 (step S208). Since the generation of the image data is the same as in the first embodiment, it will be omitted.

Then, when an input operation for displaying the contact glass 41 and the original document is performed on the personal digital assistant 200, the control portion 8 generates, according to the operation, the image showing the positions of the contact glass 41 and the original document seen from the user, displays the image and transmits, according to the input operation, information on the operation to the multifunctional peripheral 100.

Since in the image forming system Sys2 of the present embodiment, the image of the multifunctional peripheral 100 is sensed with timing desired by the user, whether or not it is necessary to identify the position is not confirmed when it is not necessary to do so, with the result that it is possible to prevent the annoyance of the user. It is also possible to reduce the number of times the multifunctional peripheral 100 and the personal digital assistant 200 communicate with each other, and thus it is possible to reduce the time necessary for the processing.

Although in the first and second embodiments, as the information on the characteristic portions of the multifunctional peripheral 100, the information which is previously stored is used, there is no limitation to this configuration. For example, a configuration may be adopted in which the image sensing portion 83 of the personal digital assistant 200 is utilized to sense the images of the individual surfaces of the multifunctional peripheral 100, and in which the image sensing data thereof is stored in the storage portion 3 or the storage portion 84 as the information on the characteristic portions for characterizing the individual surfaces. In this way, it is also possible to identify the relative position of the personal digital assistant 200 with respect to the multifunctional peripheral 100 in which information on characteristic portions is not prepared. When only with the personal digital assistant 200, the relative position of the personal digital assistant 200 with respect to the multifunctional peripheral 100 is identified, the connection to the multifunctional peripheral 100, the connection to the Internet and the like are not necessary.

The display of the position and the direction of the original document may be performed or may not be performed based on the selection of the user. After the display of the relative position of the personal digital assistant 200 with respect to the multifunctional peripheral 100 (the contact glass 41), based on an instruction of the user or the like, in addition to the image data displayed on the display portion 81, the position and the direction of the original document may be displayed.

Third Embodiment

In the embodiments described above, the image of the multifunctional peripheral 100 is sensed by the image sensing portion 83 included in the personal digital assistant 200, and based on the image sensing data thereof, the position of the personal digital assistant 200 with respect to the multifunctional peripheral 100 is identified. On the other hand, it may be possible for the user to easily recognize the position of the user with respect to the multifunctional peripheral 100. Even in such a case, the user may be confused about the place and the direction in which the original document is set or the user may set the original document in a wrong direction.

Figure 16:
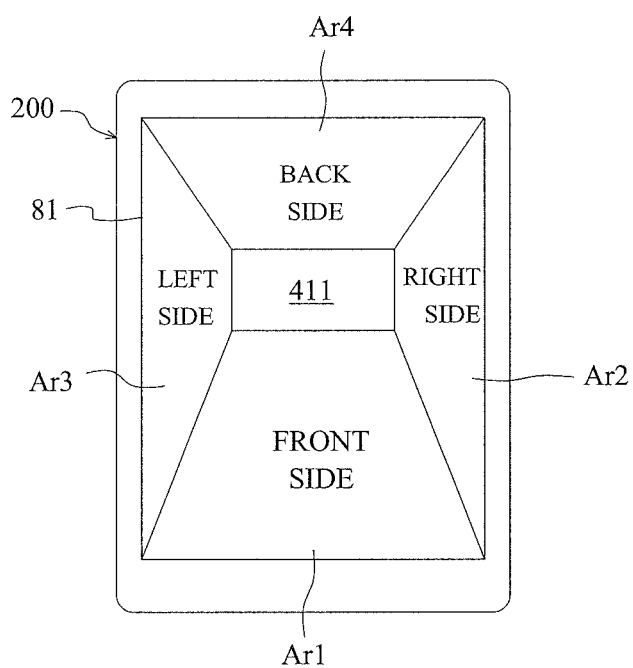
FIG. 16 is a diagram showing the display portion of the personal digital assistant.

Hence, in a third embodiment, the user operates the personal digital assistant 200 so as to perform processing for inputting the position of the user with respect to the multifunctional peripheral 100. FIG. 16 is an operation screen which is displayed on the display portion of the personal digital assistant when the user inputs the position with respect to the multifunctional peripheral. The personal digital assistant 200 has the same configuration as the personal digital assistant shown in FIG. 13, and in other words, the personal digital assistant 200 includes the relative position identification portion 87.

The display portion 81 shown in FIG. 16 is a plan view, and the schematic image 411 of the contact glass 41 is displayed in the center portion. The schematic image 411 of the contact glass 41 is rectangular, and on the four sides, the displays of "front side", "right side", "left side" and "back side" are produced. In the display portion 81, the portions corresponding to the individual surfaces are divided into regions Ar1 to Ar4. The user confirms the display portion 81, and taps one of the regions Ar1 to Ar4 corresponding to a position that is most suitable for the position in which the user stands with respect to the multifunctional peripheral 100 so as to input the position. For example, when the user determines that the user is in the front of the multifunctional peripheral 100 (the contact glass 41), the user taps the region Ar1 so as to identify the front side of the multifunctional peripheral 100 (the contact glass 41) as the relative position. The relative position identification portion 87 identifies, based on one of the regions Ar1 to Ar4 which is input, the relative position of the personal digital assistant 200 with respect to the multifunctional peripheral 100.

Thereafter, as shown in FIGS. 10, 11 and 12, the images in which the schematic image 411 of the contact glass 41, the schematic image 413 of the horizontally long original document and the schematic image 414 of the vertically long original document are combined are generated, and are displayed on the display portion 81. Here, the setting keys 412a to 412f are also displayed together with the messages on the direction of the original document.

As described above, by the operation of the user, the information on the position of the personal digital assistant 200 with respect to the multifunctional peripheral 100 is identified, and thus the image processing is not necessary. Accordingly, it is possible to shorten the time necessary for the processing, and even with the personal digital assistant 200 whose processing ability is low, it is possible to produce the display described above.

Fourth Embodiment

In the embodiments described above, the relative position identification portion 13 and the relative position identification portion 87 serving as computation circuits are included. However, in a case where there is a room for the computation ability of the control portion 1 or the control portion 8, the relative position identification portion 13 or the relative position identification portion 87 may be a program which is recorded in the storage portion 3 or the storage portion 84 and which is operated by a processing portion (processor) in the control portion 1 or the control portion 8.

An example of the image forming system according to the present disclosure is an image forming system Sys including: an image forming apparatus 100 that includes a reading portion 4 which reads an image formed in an original document; and a personal digital assistant 200 that includes a display portion which can display information. Here, in at least one of the image forming apparatus 100 and the personal digital assistant 200, a relative position identification portion 13, 87 is included that identifies the relative position of the personal digital assistant 200 with respect to the image forming apparatus 100, the relative position identification portion 13, 87 acquires the relative position of the image forming apparatus 100 and the personal digital assistant 200, the personal digital assistant 200 displays, on the display portion 81, an image that shows the position and the direction of the image forming apparatus 100 and an image that shows the arrangement position and the direction of the original document in the image forming apparatus seen from a user and the personal digital assistant 200 receives an input operation of the user on the personal digital assistant 200 and transmits, to the image forming apparatus 100, information for setting the position and the direction in which the original document is arranged in the image forming apparatus 100.

In the configuration described above, the user can accurately grasp the position with respect to the image forming apparatus, and also can set the original document in the right position and the right direction. The personal digital assistant 200 in which the position of the original document on the original document stage 41 is confirmed is operated, and thus it is possible to perform a setting for setting the original document on the original document stage 41, with the result that the convenience of the user can be enhanced. In other words, the user can intuitively recognize the arrangement position of the original document and simply make the setting for setting the original document.

In the configuration described above, on the display portion 81 of the personal digital assistant 200, the images of a plurality of the image forming apparatuses Dp1 to Dp6 in which at least one of the arrangement position and the direction of the original document is different are displayed so as to be aligned, and the images of a plurality of setting keys 412*a* to 412*f* which are included so as to select any one of the displays of a plurality of original documents are displayed. In this configuration, since the user can easily select the position and the direction of the original document, the operation becomes simple, with the result that it is unlikely that a mistake is made in the direction and the setting in which the original document is set.

In the configuration described above, the display portion 81 of the personal digital assistant 200 may also serve as a contact-type input portion.

In the configuration described above, the relative position identification portion 13, 87 identifies, based on an image shot by the personal digital assistant 200, the relative position of the personal digital assistant 200 with respect to the image forming apparatus 100. In this configuration, the user only senses an image of the image forming apparatus, and thus with the simple operation, it is possible to identify the relative position of the personal digital assistant with respect to the image forming apparatus.

In the configuration described above, the relative position identification portion 87 may identify, based on the input operation of the user on the personal digital assistant 200, the relative position of the personal digital assistant 200 with respect to the image forming apparatus 100. In this way, it is possible to simplify the processing, and thus even when the processing ability of the personal digital assistant 200 is low, it is possible to accurately identify the relative position of the personal digital assistant with respect to the image forming apparatus.

An example of an original document arrangement setting method according to the present disclosure is an original document arrangement setting method in which in the configuration described above, the image forming apparatus 100 including the image reading portion 4 which reads the image formed in the original document and the personal digital assistant 200 including the display portion 81 that can display information are connected, and in which the relative position of the personal digital assistant 200 with respect to the image forming apparatus 100 and the position and the direction of the original document are indicated to the display portion 81 of the personal digital assistant 200. The original document arrangement setting method includes: a relative position identification step of identifying, based on the information for identifying the relative position, the relative position of the personal digital assistant 200 with respect to the image forming apparatus 100; a position display step of displaying, based on information on the relative position of the personal digital assistant 200 with respect to the image forming apparatus 100, on the display portion 81 of the personal digital assistant 200, an image that shows the position and the direction of the image forming apparatus 100 and an image that shows the arrangement position and the direction of the original document in the image forming apparatus 100 seen from the user; and a setting information transmission step of transmitting, based on an input operation of the user on the personal digital assistant 200, to the image forming apparatus 100, information for setting the position and the direction in which the original document is arranged in the image forming apparatus 100.

In the configuration described above, in the position display step, on the display portion 81 of the personal digital assistant 200, the images of a plurality of the image forming apparatuses 100 in which at least one of the arrangement position and the direction of the original document is different may be displayed so as to be aligned, and the images of a plurality of setting keys 412*a* to 412*f* which are included so as to select any one of the displays of a plurality of original documents may be displayed, and in an original document setting step, an input operation for selecting any one of the setting keys 412*a* to 412*f* may be received.

In the configuration described above, in the relative position identification step, the acquisition of the image sensing data in which an image of the image forming apparatus 100 is sensed in the personal digital assistant 200 may be included, the characteristic portions of the image forming apparatus 100 whose image is sensed may be extracted by image processing on the image sensing data and based on at least one of the shape and the size of the characteristic portions, processing for identifying the relative position of the personal digital assistant 200 with respect to the image forming apparatus 100 may be performed.

In the configuration described above, the information for identifying the relative position may be information based on the input operation of the user on the personal digital assistant 200.

An example of a relative position notification program according to the present disclosure is an original document arrangement setting program which connects together the image forming apparatus 100 including the image reading portion 4 which reads the image formed in the original document and the personal digital assistant 200 including the display portion 81 that can display information and which is operated based on an input on the personal digital assistant 200. The original document arrangement setting program has the function of acquiring information for identifying the relative position, identifying, based on the information for identifying the relative position, the relative position of the personal digital assistant 200 with respect to the image forming apparatus 100 and thereafter displaying, based on information on the relative position of the personal digital assistant 100 with respect to the image forming apparatus 100, on the display portion 81 of the personal digital assistant 100, an image that shows the position and the direction of the image forming apparatus 100 and an image that shows the arrangement position and the direction of the original document seen from the user and transmitting, based on the input operation of the user on the personal digital assistant 200, to the image forming apparatus, information for setting the position and the direction of the original document arranged in the image forming apparatus 100.

Although the embodiments of the present disclosure are described above, the scope of the present disclosure is not limited to the embodiments, and various modifications can be added and practiced without departing from the spirit of the disclosure.

The present disclosure can be utilized for a system which uses a personal digital assistant such as a tablet PC or a smart phone so as to operate an image forming apparatus.

What is claimed is:

1. An image forming system comprising:
an image forming apparatus that includes a reading portion which reads an image of an original document set on an original document stage; and
a personal digital assistant that includes a display portion which can display information,
wherein in at least one of the image forming apparatus and the personal digital assistant, a relative position identification portion is included that identifies a relative position of the personal digital assistant with respect to the image forming apparatus based on a sensed image of the image forming apparatus shot by the personal digital assistant,
the relative position identification portion
identifies the personal digital assistant as being present at a front side of the image forming apparatus when the sensed image includes a grip portion of a tray provided in the image forming apparatus,
identifies the personal digital assistant as being present at one side, neighboring the front side, of the image forming apparatus when the sensed image includes an opening through which sheets are ejected, and
identifies the personal digital assistant as being present at another side, neighboring the front side, of the image forming apparatus when the sensed image does not include the opening,
the personal digital assistant displays, on the display portion, an image that shows a position and a direction of the original document stage and an image that shows an arrangement position and a direction of the original document on the original document stage from the personal digital assistant whose relative position is identified and
the personal digital assistant receives an input operation of a user on the personal digital assistant and transmits, to the Image forming apparatus, information for setting a position and a direction in which the original document is set on the original document stage.

2. The image forming system according to claim 1, wherein on the display portion of the personal digital assistant, images of a plurality of the original document stages in which at least one of the arrangement position and the direction of the original document is different are displayed so as to be aligned, and images of a plurality of setting keys which are included so as to select any one of the images of the original document stages are displayed.

3. The image forming system according to claim 1, wherein the display portion of the personal digital assistant also severs as a contact-type input portion.

4. The image forming system according to claim 1, wherein
the image forming apparatus has a front surface, one side surface neighboring the front surface, and another side surface neighboring the front surface marked with mutually different position identification indications respectively, and
the relative position identification portion recognizes the position identification indications in the sensed image and identifies, the position identification indications, the relative position of the personal digital assistant with respect to the image forming apparatus.

5. The image forming system according to claim 1, wherein the relative position identification portion identifies, based on the input operation of the user on the personal digital assistant, the relative position of the personal digital assistant with respect to the image forming apparatus.

6. An original document arrangement setting method comprising:
a step of obtaining a sensed image of the image forming apparatus shot by a personal digital assistant;
a relative position identification step of identifying, based on sensed image, personal digital the personal digital assistant
as being present at a front side of the image forming apparatus when the sensed image includes a grip portion of a tray provided in the image forming apparatus,
as being present at one side, neighboring the front side, of the image forming apparatus when the sensed image includes an opening through which sheets are ejected, and
as being present at another side, neighboring the front side, of the image forming apparatus when the sensed image does not include the opening;
a position display step of displaying, based on information on the relative position of the personal digital assistant with respect to the image forming apparatus, on a display portion of the personal digital assistant, an image that shows a position and a direction of an original document stage and an image that shows an arrangement position and a direction of an original document set on the original document stage from the personal digital assistant whose relative position is identified; and
a setting information transmission step of transmitting, based on an input operation of a user on the personal digital assistant, to the image forming apparatus, information for setting a position and a direction in which the original document is set on the original document stage.

7. A non-transitory recording medium that records an original document arrangement setting program, the recording medium comprising:
an operation of connecting together an image forming apparatus that includes a reading portion which reads an Image set on an original document stage and a personal digital assistant that includes a display portion which can display information;
a step of obtaining a sensed image of the image forming apparatus shot by the personal digital assistant;
an operation of acquiring information for identifying a relative position of the personal digital assistant with respect to the image forming apparatus;
an operation of identifying, based on sensed image, the personal digital assistant
as being present at a front side of the image forming apparatus when the sensed image includes a grip portion of a tray provided in the image forming apparatus,
as being present at one side, neighboring the front side, of the image forming apparatus when the sensed image includes an opening through which sheets are ejected, and
as being present at another side, neighboring the front side, of the image forming apparatus when the sensed image does not include the opening;
an operation of displaying, based on information on the relative position of the personal digital assistant with respect to the image forming apparatus, on the display portion of the personal digital assistant, an image that shows a position and a direction of the original document stage and an image that shows an arrangement position and a direction of an original document on the original document stage from the personal digital assistant whose relative position is identified; and an operation of transmitting, based on an input operation of a user on the personal digital assistant, to the image forming apparatus, information for setting a position and a direction in which the original document is set on the original document stage.

\* \* \* \* \*